(12) United States Patent
Sasaki

(10) Patent No.: US 9,052,799 B2
(45) Date of Patent: Jun. 9, 2015

(54) IMAGE FORMING APPARATUS, CUSTOMIZATION CONTROL METHOD AND RECORDING MEDIUM

(75) Inventor: Tohru Sasaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 453 days.

(21) Appl. No.: 13/307,633

(22) Filed: Nov. 30, 2011

(65) Prior Publication Data

US 2012/0144329 A1 Jun. 7, 2012

(30) Foreign Application Priority Data

Dec. 6, 2010 (JP) ................................. 2010-271895

(51) Int. Cl.
*G06F 3/14* (2006.01)
*G06F 3/0482* (2013.01)
(Continued)

(52) U.S. Cl.
CPC ............ *G06F 3/0482* (2013.01); *G06F 3/1204* (2013.01); *G06F 9/44505* (2013.01); *G06F 3/1205* (2013.01); *G06F 3/123* (2013.01); *G06F 3/1239* (2013.01); *G06F 3/1257* (2013.01); *G06F 3/1271* (2013.01); *G06F 3/1279* (2013.01); *H04N 1/00411* (2013.01); *H04N 1/00424* (2013.01); *H04N 1/00435* (2013.01); *H04N 1/00474* (2013.01); *H04N 1/00482* (2013.01); *H04N 1/00514* (2013.01); *H04N 1/2346* (2013.01); *H04N 2201/0094* (2013.01); *H04N 2201/0082* (2013.01)

(58) Field of Classification Search
CPC .................................... G06F 3/14; G06F 3/17
USPC .......... 715/200–277, 700–867; 700/701–866; 709/201–229; 705/50–79; 345/30–111, 345/173, 700, 619; 707/100; 455/566; 463/29; 725/39; 710/1; 386/280; 399/81

See application file for complete search history.

(56) References Cited

U.S. PATENT DOCUMENTS 5,502,839 A * 3/1996 Kolnick ............................ 710/1
2004/0021679 A1* 2/2004 Chapman et al. ............. 345/700
(Continued)

FOREIGN PATENT DOCUMENTS

JP 2003-186671 7/2003
JP 2005-293229 10/2005
(Continued)

OTHER PUBLICATIONS

Japanese Office Action dated Oct. 21, 2014.

*Primary Examiner* — Ruay Ho
(74) *Attorney, Agent, or Firm* — IPUSA, PLLC

(57) ABSTRACT

An image forming apparatus includes a unit configured to manage screen type information including a type that indicates a dependence relationship between UI screens, a unit configured to manage placement item type information including a type that indicates whether to reflect customization of a first UI screen into a placement item to be placed on a second UI screen depending on the first UI screen, a unit configured to perform management and display control for configurations of plural UI screens and a unit configured to, when a placement item of a predetermined UI screen that is display-controlled is customized, determine whether to reflect customization of the predetermined UI screen into a UI screen that depends on the predetermined UI screen based on the screen type information of the predetermined UI screen and the placement item type information of the placement item of the customization target.

8 Claims, 23 Drawing Sheets

(51) Int. Cl.
*G06F 3/12* (2006.01)
*G06F 9/445* (2006.01)
*H04N 1/00* (2006.01)
*H04N 1/23* (2006.01)

(56) References Cited

U.S. PATENT DOCUMENTS

| | | | |
|---|---|---|---|
| 2004/0220943 A1* | 11/2004 | Ross et al. | 707/100 |
| 2004/0242322 A1* | 12/2004 | Montagna et al. | 463/29 |
| 2006/0066632 A1* | 3/2006 | Wong et al. | 345/619 |
| 2007/0282890 A1 | 12/2007 | Kashiwagi et al. | |
| 2008/0175615 A1* | 7/2008 | Kodimer | 399/81 |
| 2008/0276189 A1* | 11/2008 | Dawson | 715/765 |
| 2009/0064002 A1* | 3/2009 | Katsumata et al. | 715/762 |
| 2009/0300529 A1 | 12/2009 | Endoh et al. | |
| 2010/0037156 A1 | 2/2010 | Hosoda | |
| 2010/0064230 A1* | 3/2010 | Klawitter et al. | 715/748 |
| 2010/0229194 A1* | 9/2010 | Blanchard et al. | 725/39 |
| 2010/0329642 A1* | 12/2010 | Kam et al. | 386/280 |
| 2011/0117971 A1* | 5/2011 | Kim et al. | 455/566 |
| 2011/0138295 A1* | 6/2011 | Momchilov et al. | 715/740 |
| 2012/0133600 A1* | 5/2012 | Marshall et al. | 345/173 |

FOREIGN PATENT DOCUMENTS

| | | |
|---|---|---|
| JP | 2007-323234 | 12/2007 |
| JP | 2008-258696 | 10/2008 |
| JP | 2010-039841 | 2/2010 |

\* cited by examiner

FIG.3
| ICON ID | ICON IMAGE DATA |
|---|---|
| ID0001 |  |
| ID0002 |  |
| ID0003 |  |
| ... | ... |
| ID1011 |  |

FIG.4

| PLACEMENT ID | COORDINATES | ICON ID | DISPLAY SCREEN OWNER ID | SETTING VALUE NUMBER | URL NUMBER |
|---|---|---|---|---|---|
| 001 | (10,200) | ID0001 | 0001 (COPY APPLICATION) | – | – |
| 002 | (190,200) | ID0002 | 0002 (SCANNER APPLICATION) | – | – |
| 003 | (370,200) | ID0003 | 0003 (PRINTER APPLICATION) | – | – |
| 004 | (550,200) | ID0004 | 0002 (SCANNER APPLICATION) | 3 | – |
| 005 | (730,200) | ID0005 | 1001 (typeC:SDK COPY APPLICATION) | – | – |
| 006 | (10,300) | ID0103 | 2001 (typeJ:SDK SIMPLE SCANNER APPLICATION) | 2 | – |
| 007 | (190,300) | ID0104 | 0001 (COPY APPLICATION) | 3 | – |
| 008 | (370,300) | ID0104 | 0001 (COPY APPLICATION) | – | – |
| 009 | (550,300) | ID1011 | 0050 (WEB BROWSER) | – | 1 |
| 010 | (730,300) | ID1011 | 0050 (WEB BROWSER) | – | 2 |
| ... | ... | ... | ... | ... | ... |

FIG.5

| SETTING VALUE NUMBER | REGISTRATION NAME | SETTING VALUE | | | | | | | |
|---|---|---|---|---|---|---|---|---|---|
| | | COLOR | PAPER FEED TRAY | DOCUMENT TYPE | SET DIRECTION | DENSITY | BOTH-SIDES AGGREGATION DIVISION | RESCALE | FINISH |
| 1 | AGGREGATION PRINT | FULL COLOR | A4 HORIZONTAL | PICTURE | READABLE DIRECTION | NORMAL | AGGREGATION | 71% | SORT |
| 2 | BLACK/WHITE COPY | BLACK/WHITE | A3 VERTICAL | COPY DOCUMENT | UNREADABLE DIRECTION | NORMAL | – | – | SORT |
| 3 | BOTH-SIDES A4 COPY | FULL COLOR | A4 HORIZONTAL | COPY DOCUMENT | READABLE DIRECTION | NORMAL | BOTH SIDES | – | STAPLE |
| ... | ... | | | | | | | | |
| 9 | <UNREGISTERED> | – | – | – | – | – | – | – | – |
| 10 | <UNREGISTERED> | – | – | – | – | – | – | – | – |

FIG.6

| URL NUMBER | REGISTERED NAME | URL |
|---|---|---|
| 1 | AAA HOME PAGE | http://www.AAA.co.jp/ |
| 2 | BBB HOME PAGE | http://www.rss.BBB.co.jp/ |
| ... | ... | ... |
| 9 | <UNREGISTERED> | — |
| 10 | <UNREGISTERED> | — |

FIG.7

| SCREEN TYPE | CHARACTERISTIC |
|---|---|
| DEFAULT SCREEN | ONE SCREEN EXISTS PER ONE SCREEN OF CUSTOMIZATION TARGET |
| USER-BY-USER SCREEN | ONE SCREEN EXISTS FOR EACH USER PER ONE SCREEN OF CUSTOMIZATION TARGET, HAS DEPENDENCY RELATIONSHIP TO DEFAULT SCREEN, INITIAL STATE WHEN NEW USER IS CREATED IS DEFAULT SCREEN STATE |

FIG.8

| PLACEMENT ITEM TYPE | CHARACTERISTIC | EXAMPLE IN HOME SCREEN |
|---|---|---|
| SCREEN DEPENDENT | PLACEMENT ITEM AFFECTED BY CUSTOMIZATION OF SCREEN WHICH IS DEPENDED ON | VARIOUS APPLICATION VARIOUS SDK |
| FUNCTION DEPENDENT | PLACEMENT ITEM NOT AFFECTED BY CUSTOMIZATION OF SCREEN WHICH IS DEPENDED ON BUT AFFECTED BY RESTRICTION OF FUNCTION WHICH IS DEPENDED ON | VARIOUS PROGRAM USER-BY-USER URL LINK |

FIG.9

| CUSTOMIZATION TYPE | CHARACTERISTIC | CUSTOMIZATION EXAMPLE |
|---|---|---|
| USE RESTRICTION | CUSTOMIZATION AFFECTING USABILITY OF FUNCTION | DISPLAY/ NON-DISPLAY SWITCH |
| DESIGN | CUSTOMIZATION FOR APPEARANCE, NOT AFFECTING USABILITY OF FUNCTION | LAYOUT CHANGE |
| | | SIZE CHANGE |

FIG.11
HOME SCREEN d11
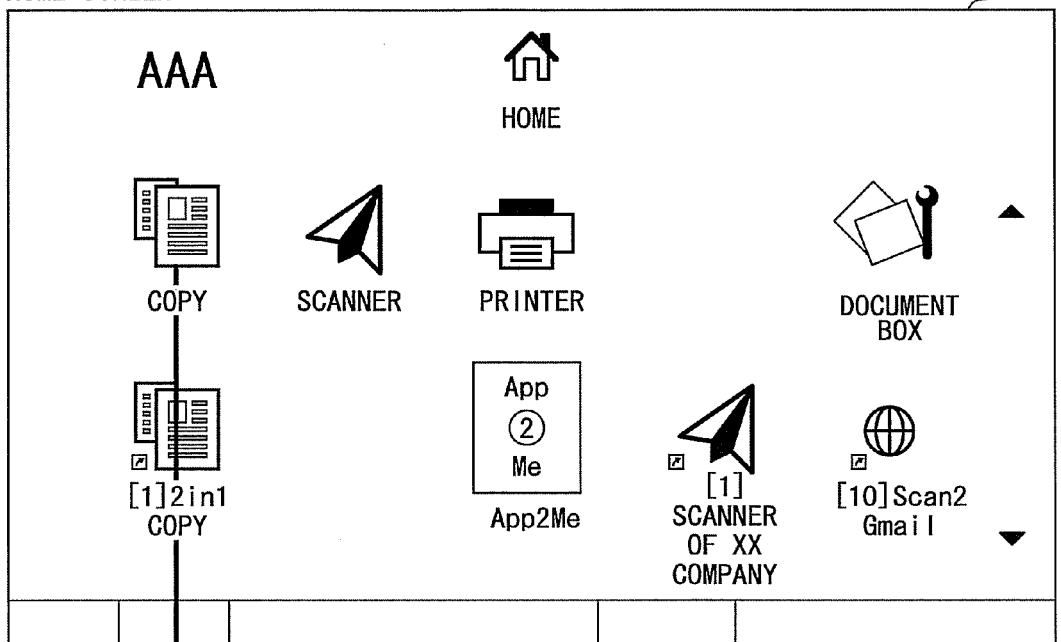
SCREEN TRANSITION
COPY APPLICATION SCREEN d12
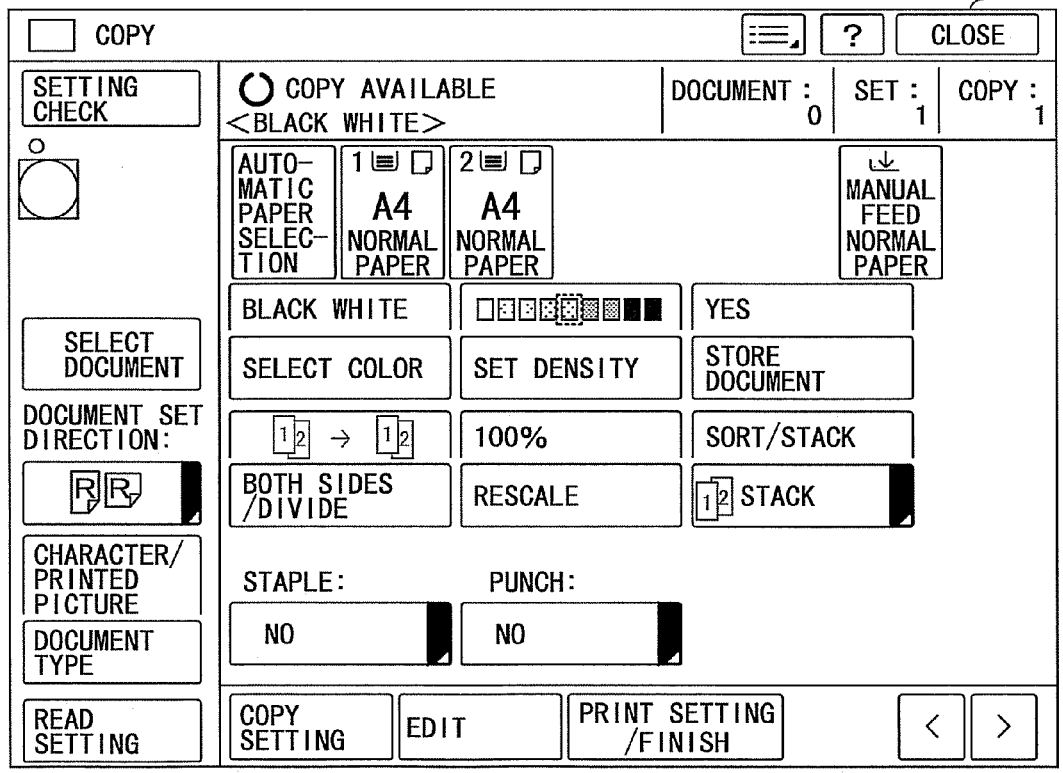

IMAGE FORMING APPARATUS, CUSTOMIZATION CONTROL METHOD AND RECORDING MEDIUM

CROSS-REFERENCE TO RELATED APPLICATIONS

This application claims the benefit of a Japanese Patent Application No. 2010-271895 filed on Dec. 6, 2010, in the Japanese Patent Office, the disclosure of which is hereby incorporated by reference.

BACKGROUND OF THE INVENTION

1. Field of the Invention

The present invention relates an image forming apparatus, a customization control method and a recording medium for customizing UI (User Interface) screens.

2. Description of the Related Art

In recent years, on a UI screen of a multifunctional machine, items customizable by a user and user screens into which customization is reflected can be dynamically changed according to user's operation environments. For example, a technique is known in which customization setting on a user having change right or on a user of a reflection target of a change is possible for each of parameters that form UI components included in a UI screen.

Patent document 1 (Japanese Laid-Open Patent Application No. 2007-323234) discloses an information processing apparatus that can control customizable items or users to whom customization is reflected on a UI screen for each user, according to operation environments of the users. The patent document 1 discloses a configuration for managing, as meta information, users having change right for parameters or users of reflection targets of customization, so as to dynamically change settings.

In the conventional technique, users who can perform customization and users of reflection targets of the customization can be set for each parameter of UI components. However, in the conventional technique, since customization is performed for one screen, the control becomes very complicated when considering management of plural users.

That is, in the conventional technique, for a UI screen of a customization target, customization setting states are managed for each of individual parameters, in which customization setting states indicate, for example, who can currently change which parameters, and which parameter affects which screen. Thus, in the conventional technique, there is a problem in that it is difficult to ascertain all customization states, so that management of customization settings becomes complicated.

On the other hand, multifunctionality of multifunctional machines is developing. Thus, multifunctional machines are provided with applications added by third vendors using a software development kit (to be referred to as SDK) and functions for browsing Web pages and the like, in addition to applications (copy, scanner, FAX, printer) that are normally provided. Also, the multifunctional machine is provided with a macro function that can call setting values (for example, A4 size, black and white, aggregation, staple) set beforehand for each application (copy application, for example). There is a problem in that, for the multifunctional machine having various functions, the number of times of operations that should be performed by a user increases when using later-added applications and macro functions.

SUMMARY OF THE INVENTION

Accordingly, it is an object in one embodiment of the present invention to provide an image forming apparatus, a customization control method and a recording medium that can make it easy to manage and control of customization setting while improving user operability.

According to an embodiment, an image forming apparatus includes:
  a first management unit configured to manage screen type information including a type that indicates a dependence relationship between UI screens when performing customization for a UI screen;
  a second management unit configured to manage placement item type information including a type that indicates whether to reflect customization of a first UI screen into a placement item to be placed on a second UI screen, wherein the second UI screen depends on the first UI screen;
  a third management unit configured to perform management and display control for configurations of plural UI screens; and
  a customization control unit configured to, in a case where a placement item of a predetermined UI screen that is display-controlled by the third management unit is customized, determine whether to reflect customization of the predetermined UI screen into a UI screen that depends on the predetermined UI screen based on the screen type information of the predetermined UI screen and the placement item type information of the placement item of the customization target.

According to another embodiment, a customization control method includes the steps of:
  obtaining, from a storage unit, screen type information including a type that indicates a dependence relationship between UI screens when performing customization for a UI screen;
  obtaining, from a storage unit, placement item type information including a type that indicates whether to reflect customization of a first UI screen into a placement item to be placed on a second UI screen, wherein the second UI screen depends on the first UI screen;
  performing management and display control for a predetermined UI screen; and
  in a case where a placement item of the predetermined UI screen that is display-controlled is customized, determining whether to reflect customization of the predetermined UI screen into a UI screen that depends on the predetermined UI screen based on the screen type information of the predetermined UI screen and the placement item type information of the placement item of the customization target.

According to the embodiments, user operability improves, and management and control for customization setting becomes easy in an image forming apparatus.

Other objects and further features of the present invention will be apparent from the following detailed description when read in conjunction with the accompanying drawings.

BRIEF DESCRIPTION OF THE DRAWINGS

FIG. 3 is a diagram showing an example of icon image information;

FIG. 4 is a diagram showing an example of icon placement information;

FIG. 5 is a diagram showing an example of setting values of a copy application;

FIG. 6 is a diagram showing an example of URL information;

FIG. 7 is a diagram showing an example of screen type information;

FIG. 8 is a diagram showing an example of placement item type information;

FIG. 9 is a diagram showing an example of customization type information;

FIG. 11 is a diagram showing an example of screen transition;

DESCRIPTION OF THE PREFERRED EMBODIMENTS

In the following, embodiments are described with reference to figures. As an example of an image forming apparatus, an MFP (Multifunction Peripheral) is described.

<Embodiment>

Figure 1:
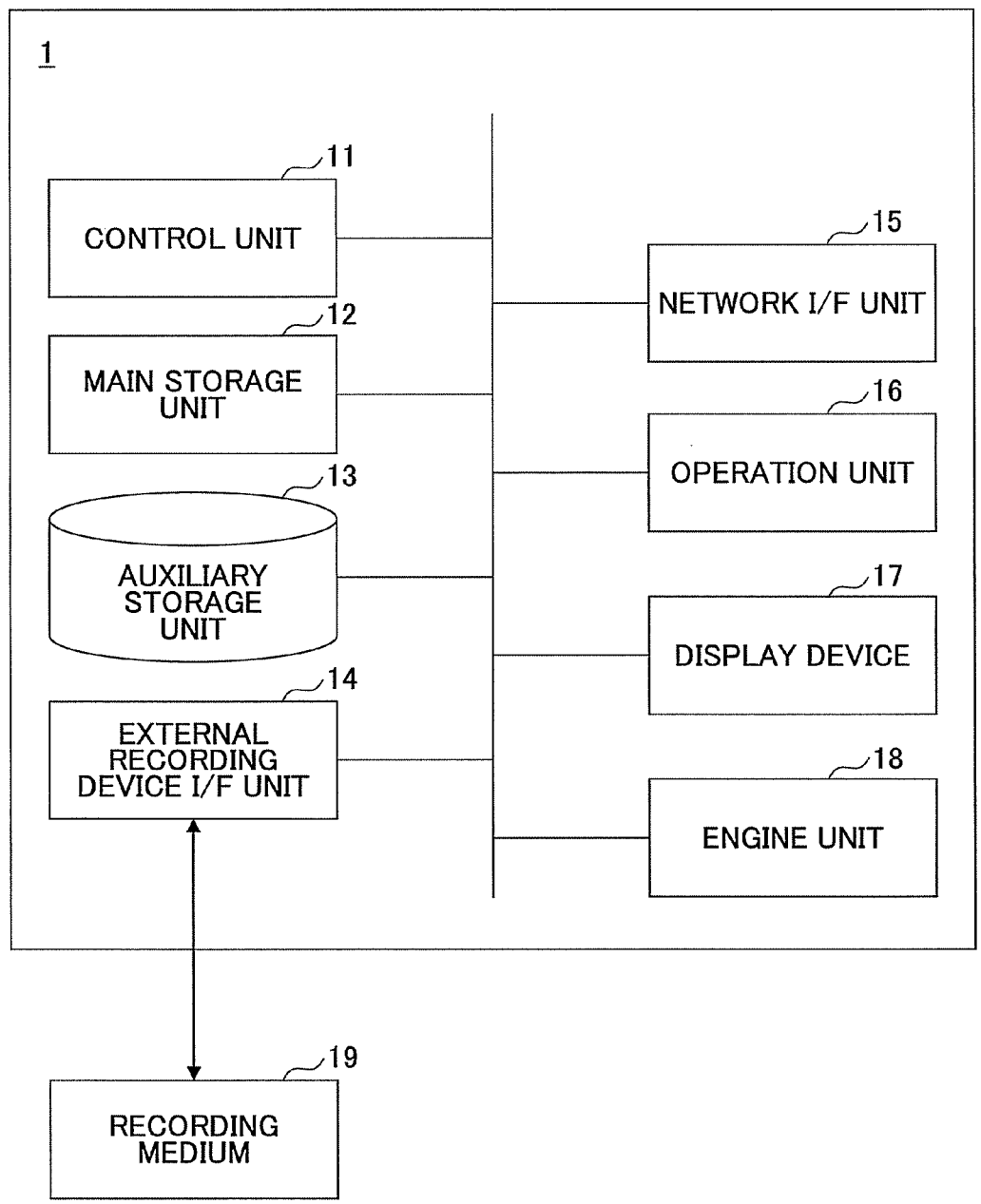
FIG. 1 is a block diagram showing an example of hardware of an MPF of an embodiment.

FIG. 1 is a block diagram showing an example of hardware of the MPF of an embodiment. As shown in FIG. 1, the MFP 1 includes a control unit 11, a main storage 12, an auxiliary storage unit 13, an external recording device I/F unit 14, a network I/F unit 15, an operation unit 16, a display device 17 and an engine unit 18. The units are connected via a bus such that data can be sent and received with each other.

The control unit 11 is a CPU for performing control for each device, calculation and processing of data in a computer. The control unit 11 is a calculation device for executing a program stored in the main storage unit 12 or the auxiliary storage unit 13. The control unit 11 receives data from an input device or a storage device, performs calculation or processing on the data, and outputs the processed data to an output device or a storage device.

The main storage unit 12 can be a ROM (Read Only Memory), a RAM (Random Access Memory) or the like. The main storage unit 12 stores or temporarily stores data and programs such as an OS that comprises basic software and application software executed by the control unit 11.

The auxiliary storage unit 13 is an HDD (Hard Disk Drive) and the like, and is a storage device for storing data related to application software and the like.

The external recording device I/F unit 14 is an interface connected via a data transmission line such as a USB (Universal Serial Bus) between a non-transitory recording medium 19 (flash memory, SD card and the like, for example) and the MFP 1.

A program is stored in the recording medium 19, and the program stored in the recording medium 19 is installed in the MFP 1 via the external recording device I/F unit 14, so that the installed program is executable by the MFP 1.

The network I/F unit 15 is an interface between a peripheral device and the MFP 1, in which the peripheral device has a communication function and is connected via a network such as a LAN (Local Area Network) or a WAN (Wide Area Network) constructed by a data transmission line such as a cable and/or a wireless line.

The operation unit 16 and the display device 17 are formed by a key switch (hardware key) and an LCD (Liquid Crystal Display) having a touch panel functions (including software keys of a Graphical User Interface). The units 16 and 17 are a display and/or an input device functioning as a UI (ser Interface) for using functions of the MFP 1.

The engine unit 18 reads a paper document, and prints an image to a transfer paper as an input and output device of image data. The engine unit 18 may be further provided with a scanner engine.

<Function>

Figure 2:
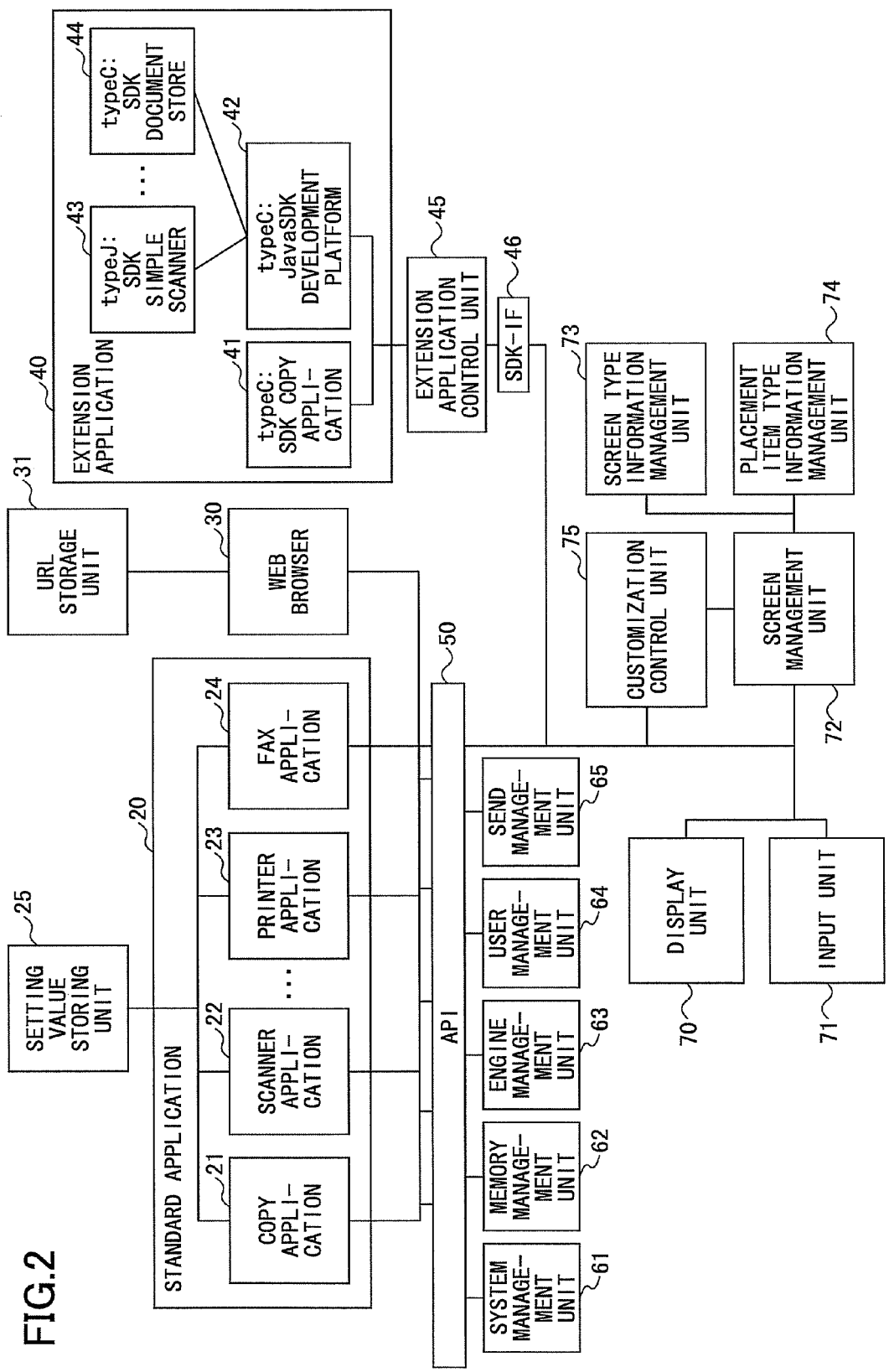
FIG. 2 is a block diagram showing an example of functions of the MFP of the embodiment.

Next, functions of the MFP 1 are described. FIG. 2 is a block diagram showing an example of functions of the MFP 1. The MFP 1 includes a standard application 20, a setting value storage unit 25, a Web browser 30, a URL storage unit 31, an extension application 40, an extension application control unit 45, and an SDK-IF 46. The MFP 1 may also include a scanner setting value storage unit 47 and a stored setting value storage unit 48. Also, the MFP 1 includes an API (Application Program Interface) 50, a system management unit 61, a memory management unit 62, an engine management unit 63, a user management unit 64 and a send management unit 65. In addition, the MFP 1 includes a display unit 70, an input unit 71, a screen management unit 72, a screen type information management unit 73, a placement item type information management unit 74 and a customization control unit 75.

The standard application 20 is an application normally included in the MFP 1. For example, there are standard applications 20 such as a copy application 21, a scanner application 22, a printer application 23, a FAX application 24. The standard application 20 can create an operation screen and execute jobs of the application. Also, the standard application 20 stores setting values or reads (calls) setting values from the setting value storage unit 25. This function is called a macro function. The standard application 20 outputs data to the display unit 70 using the API 50.

The setting value storage unit 25 stores setting values that are registered beforehand for each setting item for each standard application.

The Web browser 30 communicates with an http server to display a Web page. The Web browser 30 obtains URL information from the URL storage unit 31 and outputs a Web page of the URL to the display unit 70. The URL storage unit 31 stores a URL displayed by the Web browser 30. In an embodiment, the Web browser 30 may be not provided in the MFP 1.

The extension application 40 is an application that can be additionally installed by an SDK. Also, the extension application 40 executes jobs of screen creation and the application. An SDK application developed with a C language is classified as Type C, and an SDK application developed by Java is classified as Type J.

The SDK copy application 41 is an SDK application developed using the C language. The SDK copy application 41 is classified into an SDK application of Type C (developed by C language).

The Java SDK development platform 42 is an SDK application developed using the C language. The Java SDK development platform 42 is classified into an SDK application of Type C, and is a JavaVM platform for executing an SDK application developed by Java.

The SDK simple scanner 43 is an SDK application developed using Java. The SDK simple scanner 43 is classified into an SDK application of Type J.

The SDK document storage 44 is an SDK application developed using Java. The SDK document storage 44 is classified into an SDK application of Type J.

The extension application control unit 45 manages all of the SDK applications. The SDK-IF 46 is an interface between the SDK application (such as the SDK simple scanner) and each management unit, input unit, display unit and the like.

The extension application control unit 45 directly manages SDK applications of Type C. The Java SDK development platform 42 of the Type C SDK application makes it possible to execute SDK applications of Type J.

The system management unit 61 manages the status of the whole system. The system management unit 61 requests each application to display an operation screen. The memory management unit 62 performs memory management and creation of scanned file data. The engine management unit 63 performs control for reading documents. The user management unit 64 performs user authentication and management of scanner transfer destination. The send management unit 65 controls data transmission from the MFP 1 to other apparatuses.

The display unit 70 displays a screen of a list of applications. Also, the display unit 70 displays operation screens of standard applications 20 and extension applications 40, and a Web page created by the Web browser 30.

The input unit 71 detects pressing of an icon in the list screen. The icon is one of the UI components, and may be also referred to as a placement item. The input unit 71 receives pressing of an icon as an operation request for the icon. Also, the input unit 71 receives an input from an operation screen of the standard application 20 or the extension application 40, or from the Web page. In addition, the input unit 71 receives a customization operation for a UI component of a UI screen.

The screen management unit 72 manages configurations of plural UI screens, and controls display of predetermined UI screens. The screen management unit 72 determines a screen display owner from among standard applications 20, extension applications 40 and the Web browser 30 according to an icon in the list screen requested from the input unit 71, and transmits a screen display request to the owner. The screen management unit 72 determines an after-mentioned placement item type for a UI component that is newly registered in the list screen of applications.

The screen management unit 72 stores and manages icon images and icon placement information (including IDs of each extension application) to be displayed on the list screen of applications. Also, the screen management unit 72 creates the list screen of applications based on icon images and the icon placement information.

The screen management unit 72 updates screen information based on customization details due to control from the customization control unit 75.

Regarding a difference from the conventional technique, for example, a screen dedicated for an extension application is displayed in the conventional technique. On the other hand, the extension application control unit 45 of the present embodiment does not output a dedicated screen. Also, in the present embodiment, the screen management unit 72 manages screen transition of the whole applications including the extension application 40, the standard application 20 and the Web browser 30.

The screen type information management unit 73 manages screen type information including a type representing a dependence relationship between screens when performing customization. For example, as types of screens, there is a default screen, and a user-by-user screen depending on the default screen. When a default screen is customized, the customization is basically reflected in the user-by-user screen. However, when a user-by-user screen is customized, the customization is not reflected in the default screen.

The placement item type information management unit 74 manages placement item type information including a type that indicates whether to reflect customization of a screen which is depended on in a placement item (icon) placed in a UI screen. As types of placement items, there are a screen dependent type in which customization of a screen which is depended on is reflected, and a function dependence type in which customization of a screen which is depended on is not reflected. However, even for the placement item of the function dependent type, in the case when customization of the screen which is depended on is use restriction of a depending function, the use restriction is reflected.

The customization control unit 75 controls customization for placement items of the UI screen. In the case when a placement item of a predetermined UI screen is customized, the customization unit 75 determines whether to reflect the customization into a UI screen other than the predetermined UI screen based on screen type information of the predetermined UI screen and placement item type information of the placement item to be customized. The customization control unit 75 applies customization details to other UI screens if predetermined conditions are satisfied.

The standard application 20, the Web browser 30, the extension application 40, each management unit 61-65, the screen management unit 72, the customization control unit 75, and the extension application control unit 46 may be realized by the control unit 11, the main storage unit 12 as a work memory, and the auxiliary storage unit 13 storing various programs and the like. The setting value storage unit 25, the URL storage unit 31, the screen type information management unit 73, and the placement item type information management unit 74 may be realized by the main storage unit 12 and/or the auxiliary unit 13 and the like. The display unit 70 may be realized by the control unit 11 and the display device 17, for example. The input unit 71 may be realized by the operation unit 16 and the like.

<Data Structure>

Next, a data structure of data stored in each management unit is described. The screen management unit 72 stores icon image information and icon placement information. FIG. 3 is a diagram showing an example of icon image information.

In the icon image information shown in FIG. 3, each icon ID is associated with corresponding icon image information. The icon image information is pre-registered image information or image information that is added later. When icon image information is added, an icon ID is automatically assigned by the screen management unit 72, for example.

FIG. 4 is a diagram showing an example of icon placement information. The icon placement information shown in FIG. 4 has a data structure including coordinates in the list screen, an icon ID corresponding to an icon image, and a display screen owner ID specifying an owner that displays the screen, for each placement ID of icon. Also, the icon placement information includes an application setting value (when there is one) for the standard application 20, and a URL number for the Web browser 30.

When an extension application 40 is newly installed, the screen management unit 72 assigns a value obtained by incrementing the maximum value of the existing placement ID as a placement ID. In addition, coordinates of an available position are added to the icon placement information. As to the display screen owner ID, a new ID originally held by the extension application 40 is added to the icon placement information.

As to the icon ID, when there is an icon prepared by the extension application 40, an icon ID is assigned by incrementing the maximum value of the existing icon ID, and icon image information is updated. If there is not the icon, a system-default icon ID is assigned.

By holding the data structure shown in FIG. 4, icons of the standard applications 20 and the extension applications 40 are displayed in a same list screen. For example, a same list screen displays the scanner application 22 of the standard application 20 having a placement ID of 4 and the SDK copy application 41 of the extension application 40 having a placement ID of 5. Even for the same copy application 21, if settings values for the macro function are different, different icons are displayed. For examples, different icons are displayed for the copy application 21 of a placement ID of 7 and the copy application 21 of a placement ID of 8.

Next, setting values of macro functions of the standard application 20, that are stored in the setting value storage unit 25, are described. FIG. 5 is a diagram showing an example of setting values of the copy application 21.

As shown in FIG. 5, as to the setting value information, a user registers a registration name and setting values for each setting value number beforehand. The setting value number is associated with the icon placement information (refer to FIG. 4) of the list screen.

For example, as to a macro function of the setting value number of 1, the registration name is "aggregation print", and setting values are set as follows: color—"full color", paper feed tray—"A4 horizontal", document type—"picture", set direction—"readable direction", density—"normal", both-sides aggregation division—"aggregation", rescale—"71%" and finish—"sort".

Next, URL information that is stored in the URL storage unit 31 is described. FIG. 6 is a diagram showing an example of URL information. As shown in FIG. 6, a registration name and a URL are registered for each URL number by a user beforehand. The URL number is associated with icon placement information in the list screen (refer to FIG. 4).

For example, as for the URL number "1", the registration name is associated with "AAA homepage", and the URL is associated with "http://www.AAA.co.jp/".

Next, screen type information that is stored in the screen type information management unit 73 is described. FIG. 7 is a diagram showing an example of the screen type information. As shown in FIG. 7, the screen type information holds a screen type and a characteristic of the screen type. In the example shown in FIG. 7, "default screen" and "user-by-user screen" are defined as the screen type.

The characteristic of "default screen" is that one default screen exists per one screen of a customization target. The characteristic of the "user-by-user screen" is that one user-by-user screen exists for each user per one screen of a customization target. The "user-by-user screen" has a dependence relationship with respect to the "default screen". That is, the "user-by-user screen" depends on the "default screen".

Also, the initial state of "user-by-user screen" when creating a new user is the "default screen".

For example, when applying screen types to a home screen, there are two types that are a default screen of the home screen and a user-by-user screen of the home screen. Regarding the user-by-user screen, there are home screens for registered users. Each screen type may be stored while being associated with a screen ID, for example.

Next, placement item type information stored in the placement item type information management unit 74 is described. FIG. 8 is a diagram showing an example of the placement item type information. As shown in FIG. 8, the placement item type information includes a placement item type, a characteristic and an example in a home screen. Although an example in a home screen is described in FIG. 8, other screens may be applied.

In the example shown in FIG. 8, two types of placement item types are defined, which are "screen dependent" and "function dependent". The characteristic for the "screen dependent" is that the corresponding item is a placement item to be affected by customization of a screen which is depended on. The characteristic for the "function dependent" indicates that the corresponding item is a placement item that is not affected by customization of a screen which is depended on, but is affected by use restriction of a function which is depended on.

As shown in FIG. 8, as examples in the home screen, there are various applications and various SDKs as items of "screen dependent". Also, there are various programs and user-by-use URL links as items of "function dependent".

Each of the various programs and user-by-use URL links is a placement item created based on a function of various applications and various SDKs. The placement item becomes unusable when use of a function which is depended on is restricted.

Examples of the various applications, various SDKs, various programs, and user-by-user URL links are as follows,
Various applications: copy, scanner, printer, document box, browser;
Various SDK: App2Me;
Various programs: 2in1 copy, scanner of xx company; and
User-by-user URL link: Scan2Gmail.

For example, "2in1 copy" is a placement item of "function dependent" based on the copy application in the various applications, "scanner of xx company" is a placement item of "function dependent" based on the scanner application in the various applications, and "Scan2Gmail" is a placement item of "function dependent" based on the browser in the various applications. Each of the various programs is a macro function, for example.

Next, customization type information stored in the customization control unit 75 is described. FIG. 9 is a diagram showing an example of the customization type information. As shown in FIG. 9, the customization type information includes a customization type, a characteristic and a customization example.

In the example shown in FIG. 9, "use restriction" and "design" are defined as the customize types. As a characteristic of the "use restriction", the "use restriction" indicates customization that affects use availability of the function. The characteristic of the "design" is that the customization does not affect use availability of any function, but instead indicates a customization only for appearance. As customization examples of FIG. 9, there can be switching between display and nondisplay (hide) in the use restriction. For the "design", there can be layout changes and size changes.

Screen Example

Figure 10:
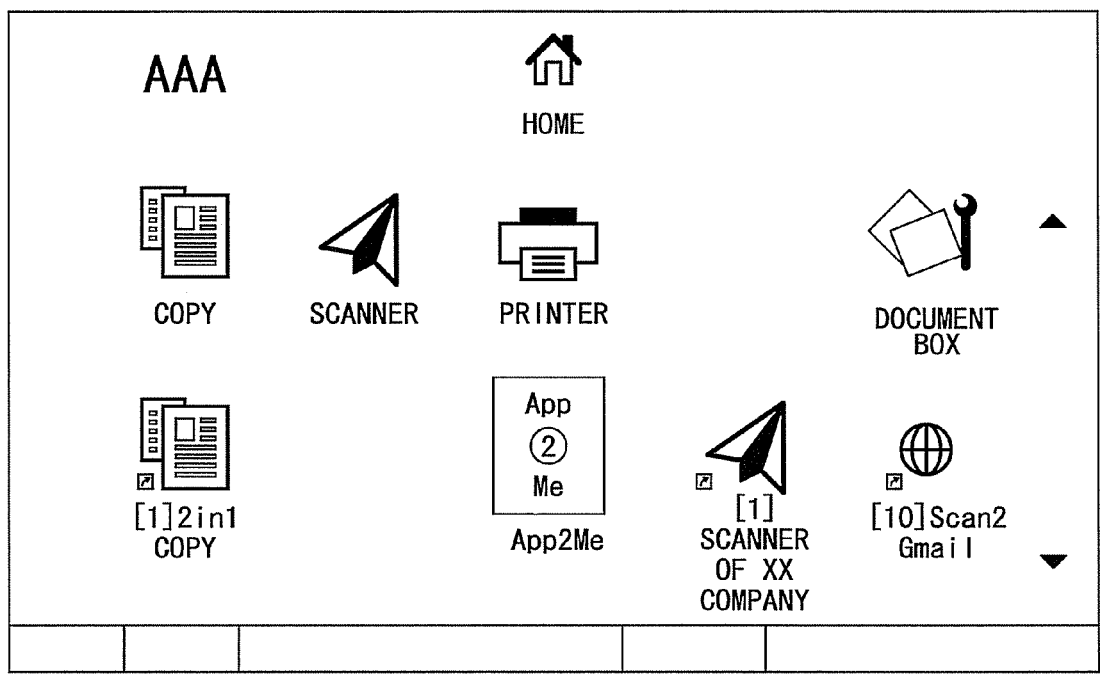
FIG. 10 is a diagram showing an example of a list screen of applications.

Next, screens and screen transitions are described. FIG. 10 is a diagram showing an example of a list screen of applications. As shown in FIG. 10, one screen of the list screen displays shortcut icons (placement items) for standard applications (copy, scanner, printer), an extension application (App2Me), registered setting values (2in1 copy, scanner of xx company) for the standard applications 20, and a Web browser 30 (Scan2Gmail).

When an icon is pressed on the screen shown in FIG. 10, a corresponding application screen, a Web page, or an application screen of a state in which a registered setting value is set is displayed. When icons do not fit into one screen, a next page can be shown by pressing a page advancing button 100 placed at lower right.

Next, an example of screen transition from the list screen is described. FIG. 11 is a diagram showing an example of screen transition. As shown in FIG. 11, when a copy icon at the upper left is pressed on the list screen d11, a copy application screen s12 is displayed. Accordingly, a screen of a function (including an extension application) can be displayed by performing one operation (pressing icon) from a screen on which a list of applications is displayed, so that a burden for a user can be reduced.

Control for screen transition is performed by the screen management unit 72. The list screen d11 may be set to be a home screen.

<Screen Configuration>

Figure 12:
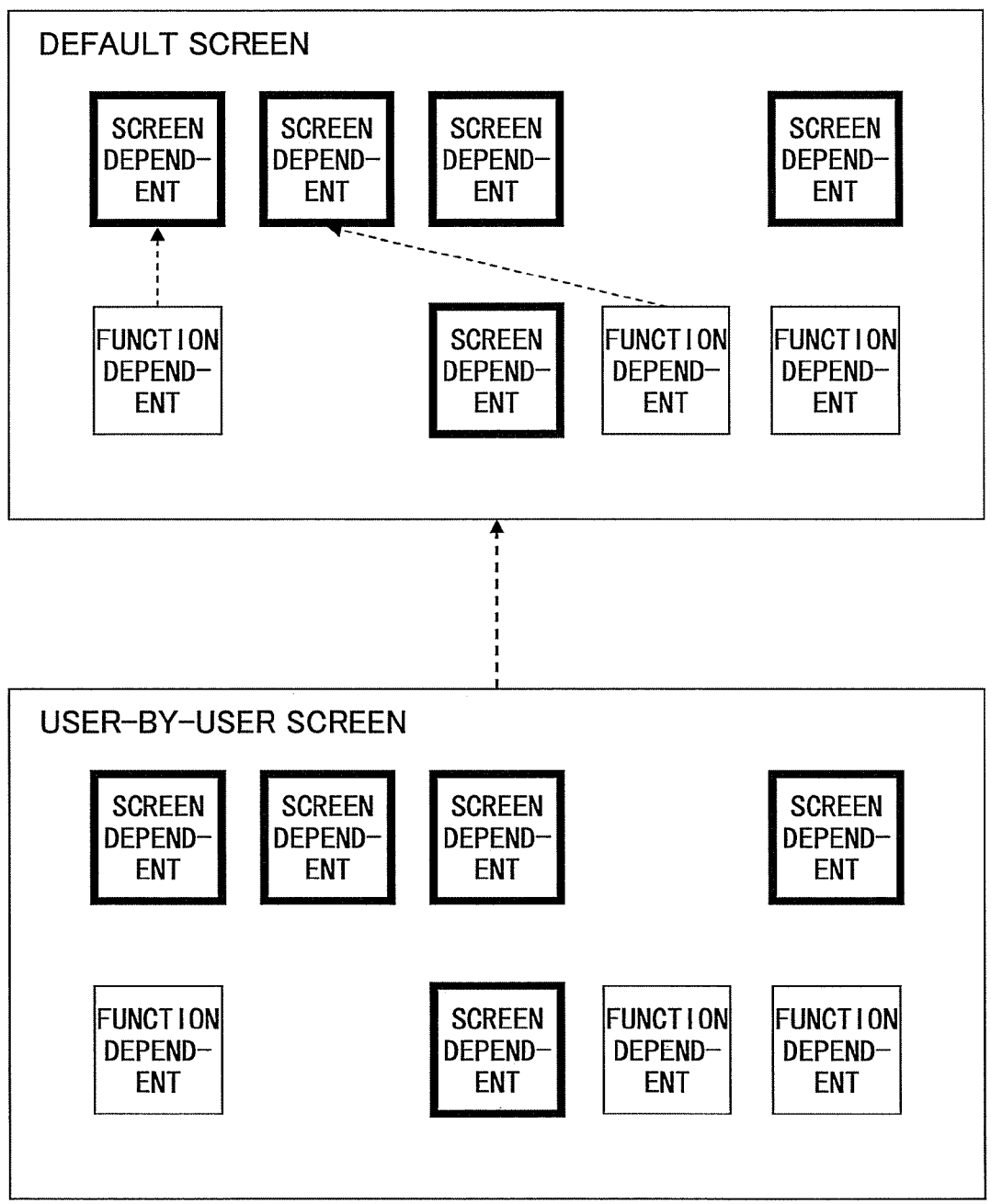
FIG. 12 is a diagram showing a configuration example of each screen.

Next, configuration examples of screen types and placement item types are described. FIG. 12 is a diagram showing a configuration example of each screen. FIG. 12 is a diagram showing examples of placement items and their placements in the home screen shown in FIG. 10.

The default screen shown in FIG. 12 is depended on by the user-by-user screen, in which the direction of dependency is only from the user-by-user screen to the default screen. That is, the default screen has a single-direction dependency relationship from the user-by-user screen. This relationship means that there is a possibility in that the user-by-user screen is affected by customization for the default screen.

Placement items are placed in each screen. FIG. 8 shows "screen dependent" and "function dependent" as placement item types. In the example shown in FIG. 12, each placement item of "screen dependent" is shown using a square thick-frame, and each placement item of "function dependent" is shown using a square thin frame.

The "screen dependent" depends on "default screen", that is, the "screen dependent" has a dependence relationship with respect to the "default screen". The "function dependent" is affected by use restriction of a function which is depended on. The expression used in FIG. 12 is also used in the following examples.

Figure 13:
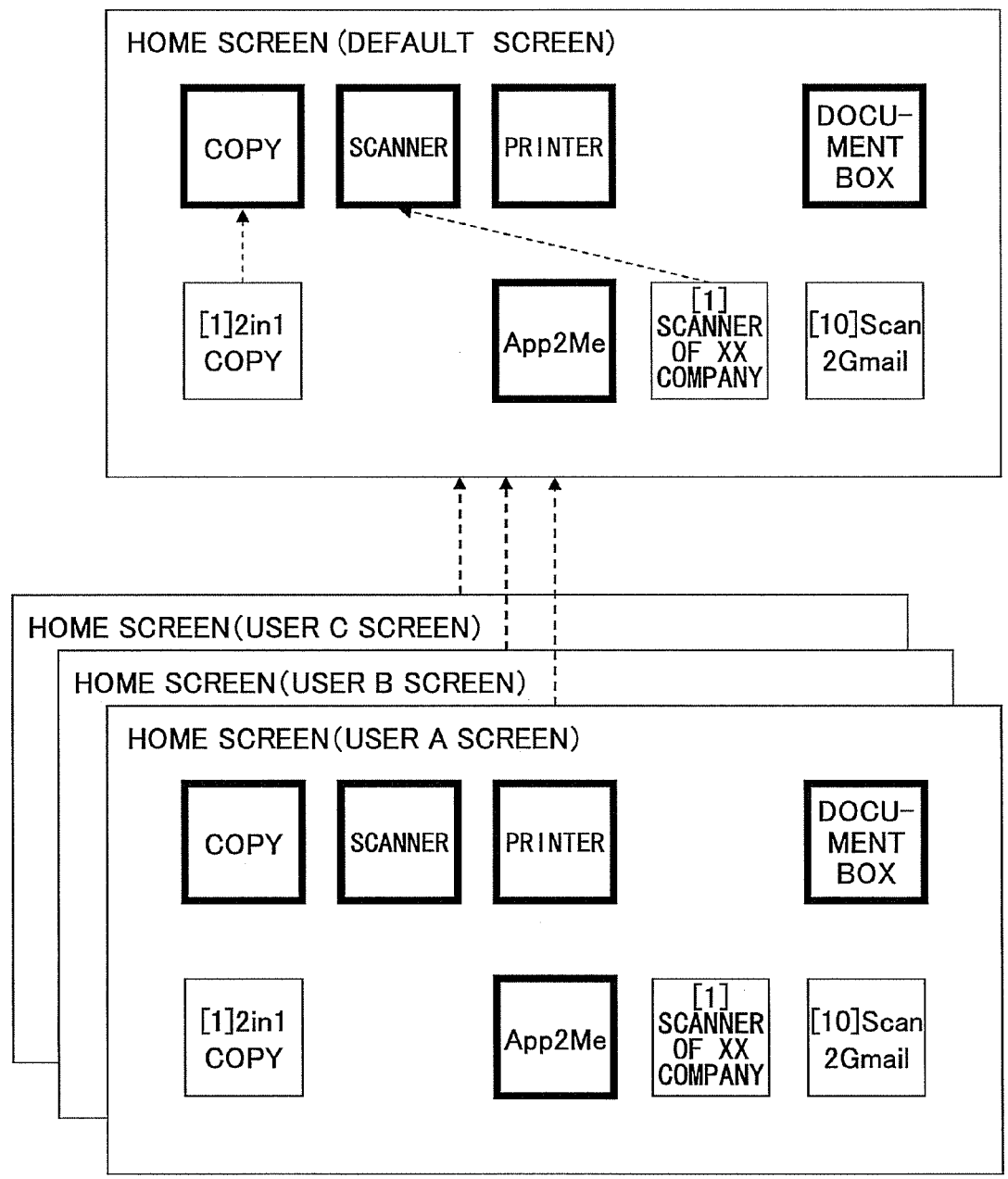
FIG. 13 is a diagram showing a configuration example of a home screen shown.

FIG. 13 is a diagram showing a configuration example of the home screen shown in FIG. 10. In the example shown in FIG. 13, three users (A, B and C) are registered, and a snapshot right after the user A is registered is shown.

The user-by-user screen depends on the default screen, so that initial values at the time of user registration become setting values of the default screen. In the following, concrete examples are shown in the case where customization is performed for the default screen and the user A screen.

<Customization>

Figure 14:
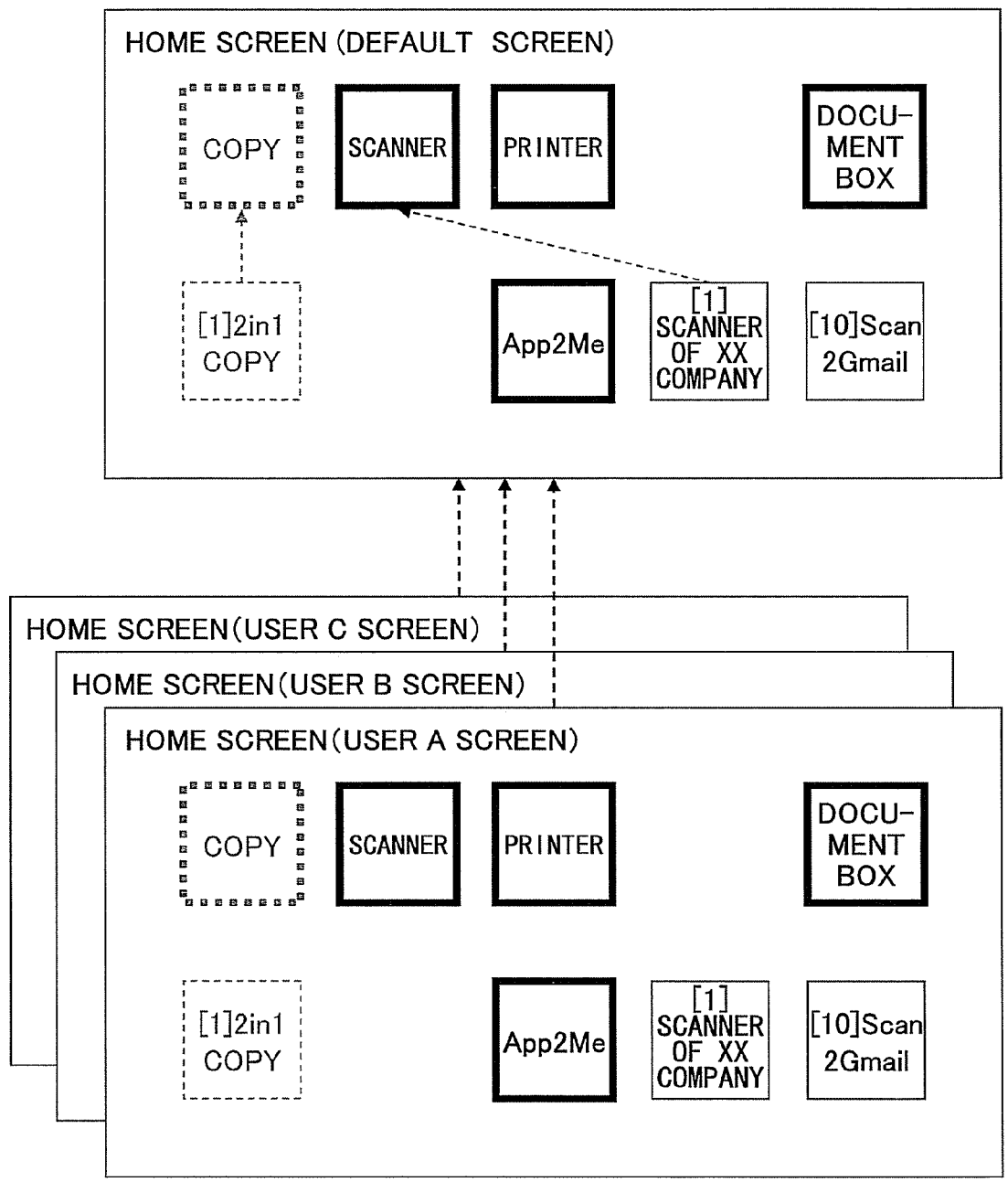
FIG. 14 is a diagram showing an example of customization (1) in an embodiment.

FIG. 14 is a diagram showing an example of customization (1) in an embodiment. FIG. 14 shows a customization example in which a copy icon (one of the various applications) displayed on the default screen is hidden (that is, changed to a nondisplay state).

The input unit 71 receives customization operation for hiding the copy icon, and outputs received information to the screen management unit 72. The screen management unit 72 obtains a screen type of the screen of the customization target and placement item type information of placement items.

The screen management unit 72 outputs the obtained information and details of customization to the customization control unit 75. At this time, the customization control unit 75 recognizes a customization request from the obtained information.

In the example shown in FIG. 14, the customization request includes screen type: default screen, placement item type: screen dependent, and customization type: use restriction.

The customization control unit 75 performs control so as to hide copy, icons of all users by hiding the copy icon of the default screen. That is, the customization control unit 75 performs use restriction to prevent every user from using the copy application.

Since "2in1 copy" that is a program for the copy function depends on the copy function in each of the default screen and the user-by-user screens, the customization control unit 75 performs control to restrict use of the "2in1 copy". Thus, the "2in1 copy" icon is hidden like the copy icon.

Figure 15:
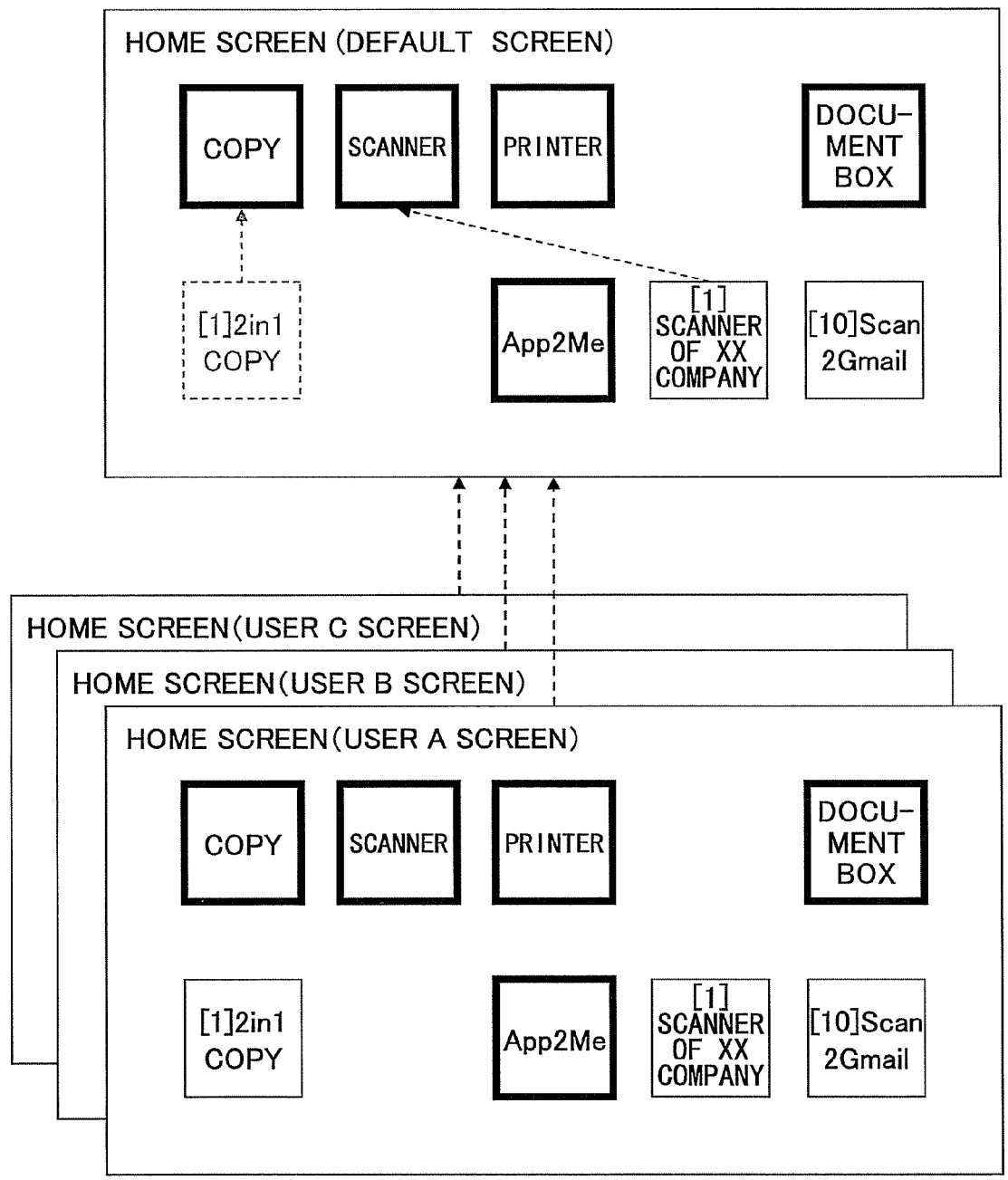
FIG. 15 is a diagram showing an example of customization (2) in an embodiment.

FIG. 15 is a diagram showing an example of customization (2) in an embodiment. FIG. 15 shows an example in which the "2in1 copy" icon (one of the various program icons) displayed on the default screen is hidden (is changed to a nondisplay state).

The input unit 71 receives customization operation for hiding the "2in1 copy" icon, and outputs received information to the screen management unit 72. The screen management unit 72 obtains a screen type of the screen of the customization target and placement item type information of the placement item.

The screen management unit 72 outputs the obtained information and details of customization to the customization control unit 75. At this time, the customization control unit 75 recognizes a customization request from the obtained information.

In the example shown in FIG. 15, the customization request includes screen type: default screen, placement item type: function dependent, and customization type: use restriction.

The customization control unit 75 hides the "2in1 copy" icon on the default screen. At this time, there is no effect on all of existing users (A, B and C). The reason is that the placement item type of the "2in1 copy" is "function dependent" and use restriction of the copy function on which the "2in1 copy" depends is not applied.

After that, if a new user is added, as described with reference to FIG. 13, the "2in1 copy" icon is hidden as an initial state of the user-by-user screen. But, it is possible to enable the "2in1 copy" icon to be used by customization of each user.

Figure 16:
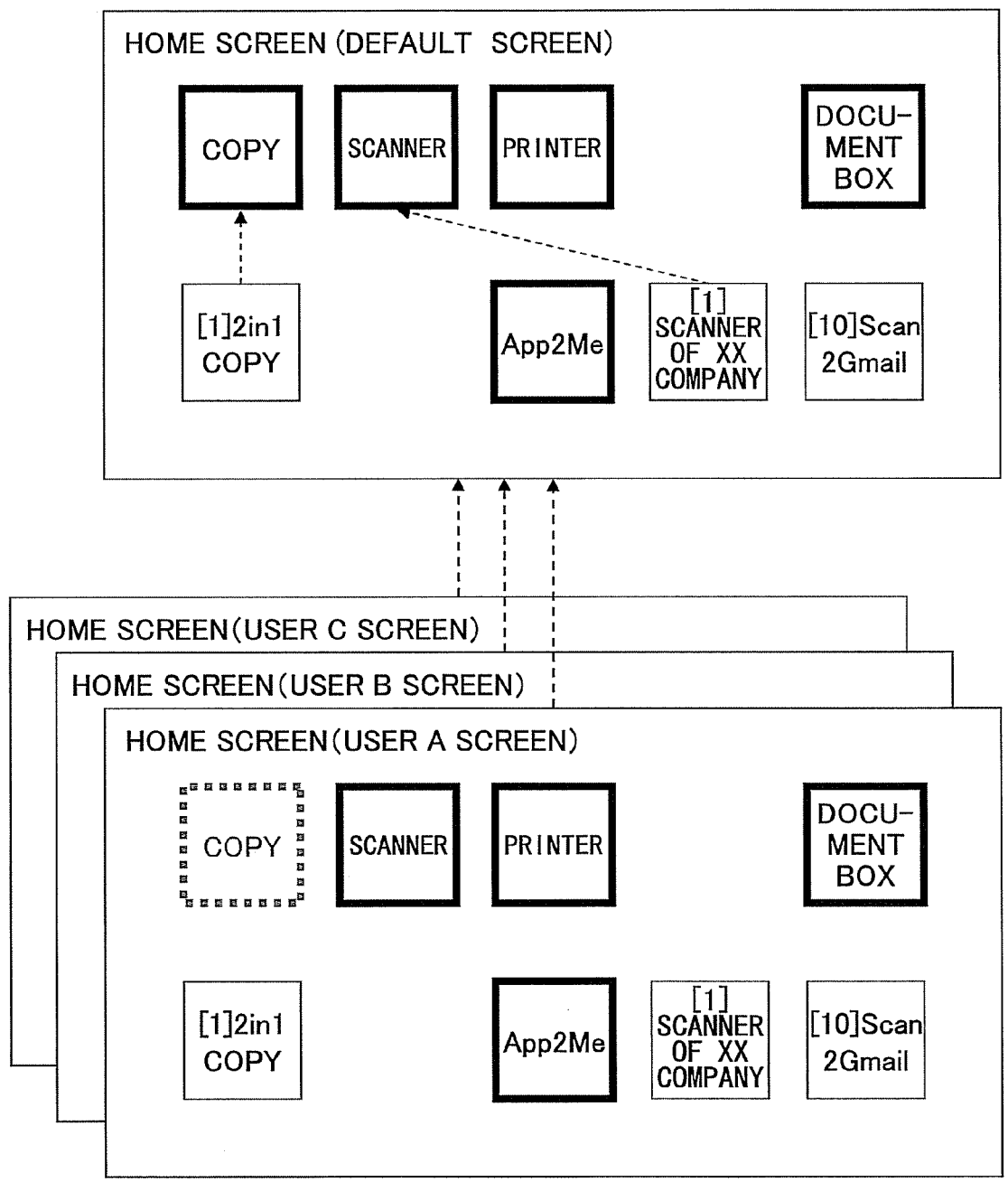
FIG. 16 is a diagram showing an example of customization (3) in an embodiment.

FIG. 16 is a diagram showing an example of customization (3) in an embodiment. FIG. 16 shows an example in which a copy icon (one of the various applications) displayed on the user A screen is hidden (is changed to a nondisplay state).

The input unit 71 receives customization operation for hiding the copy icon, and outputs received information to the screen management unit 72. The screen management unit 72 obtains a screen type of the screen of the customization target and placement item type information of the placement item.

The screen management unit 72 outputs the obtained information and details of customization to the customization control unit 75. At this time, the customization control unit 75 recognizes a customization request from the obtained information.

In the example shown in FIG. 16, the customization request includes screen type: user-by-user screen, placement item type: screen dependent, and customization type: use restriction.

The customization control unit 75 hides the copy icon of the user A screen. At this time, there is no effect on existing other users (B, C) and on the default screen. The reason is that the screen type of the "user A screen" is the "user-by-user screen".

That is, this case is effective in a situation where, although use of the copy application is allowed for every user, the copy application on the user A screen is desired to be hidden since the user A does not use the copy application normally. When the situation changes so that the user A wants to use the copy application, it is possible to enable the copy application by displaying the icon.

Although the "2in1 copy" icon depends on the copy function, it is not affected by use restriction since the customization target screen is "user-by-user screen".

However, if it is assumed that the copy icon is customized to be hidden in the default screen before, the "2in1 copy" that is a program for the copy function in each of the default screen and the user-by-user screens can not be used since the "2in1 copy" depends on the copy function. Also, since use restriction is applied to every user, the copy icon cannot be displayed.

Figure 17:
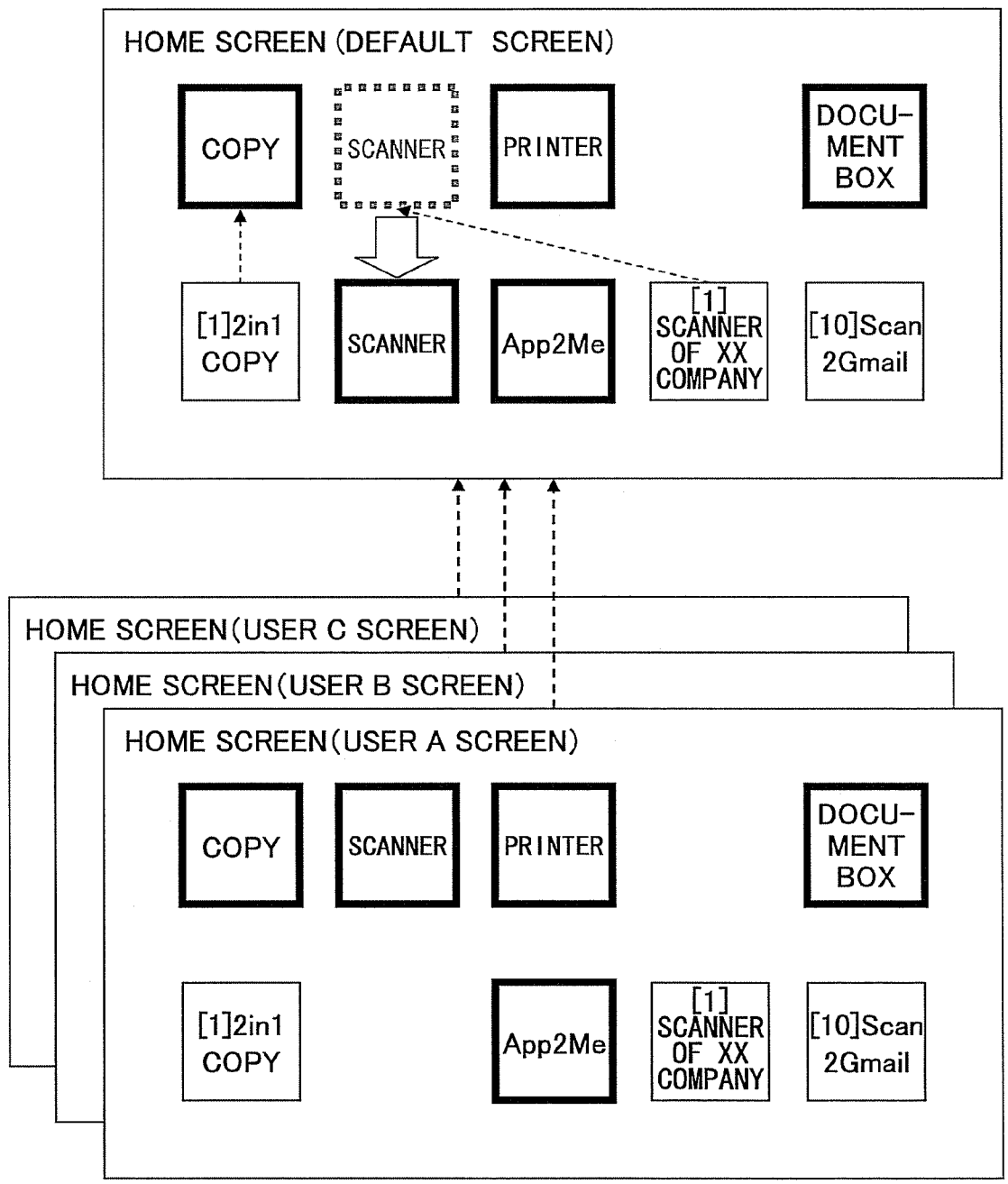
FIG. 17 is a diagram showing an example of customization (4) in an embodiment.

FIG. 17 is a diagram showing an example of customization (4) in an embodiment. FIG. 17 shows an example in which layout change is performed for a scanner icon (one of the various applications) displayed on the default screen.

The input unit 71 receives customization operation for moving the scanner icon, and outputs received information to the screen management unit 72. The screen management unit 72 obtains a screen type of the screen of the customization target and placement item type information of the placement item.

The screen management unit 72 outputs the obtained information and details of customization to the customization control unit 75. At this time, the customization control unit 75 recognizes a customization request from the obtained information.

In the example shown in FIG. 17, the customization request includes screen type: default screen, placement item type: screen dependent, and customization type: design.

The customization control unit 75 changes the layout of the scanner icon on the default screen. There is no effect on the existing users (A, B, C). The reason is that the customization type is design.

After that, if a new user is added, as described with reference to FIG. 13, placement of the "scanner" icon follows the default screen as an initial state of the user-by-user screen.

Figure 18:
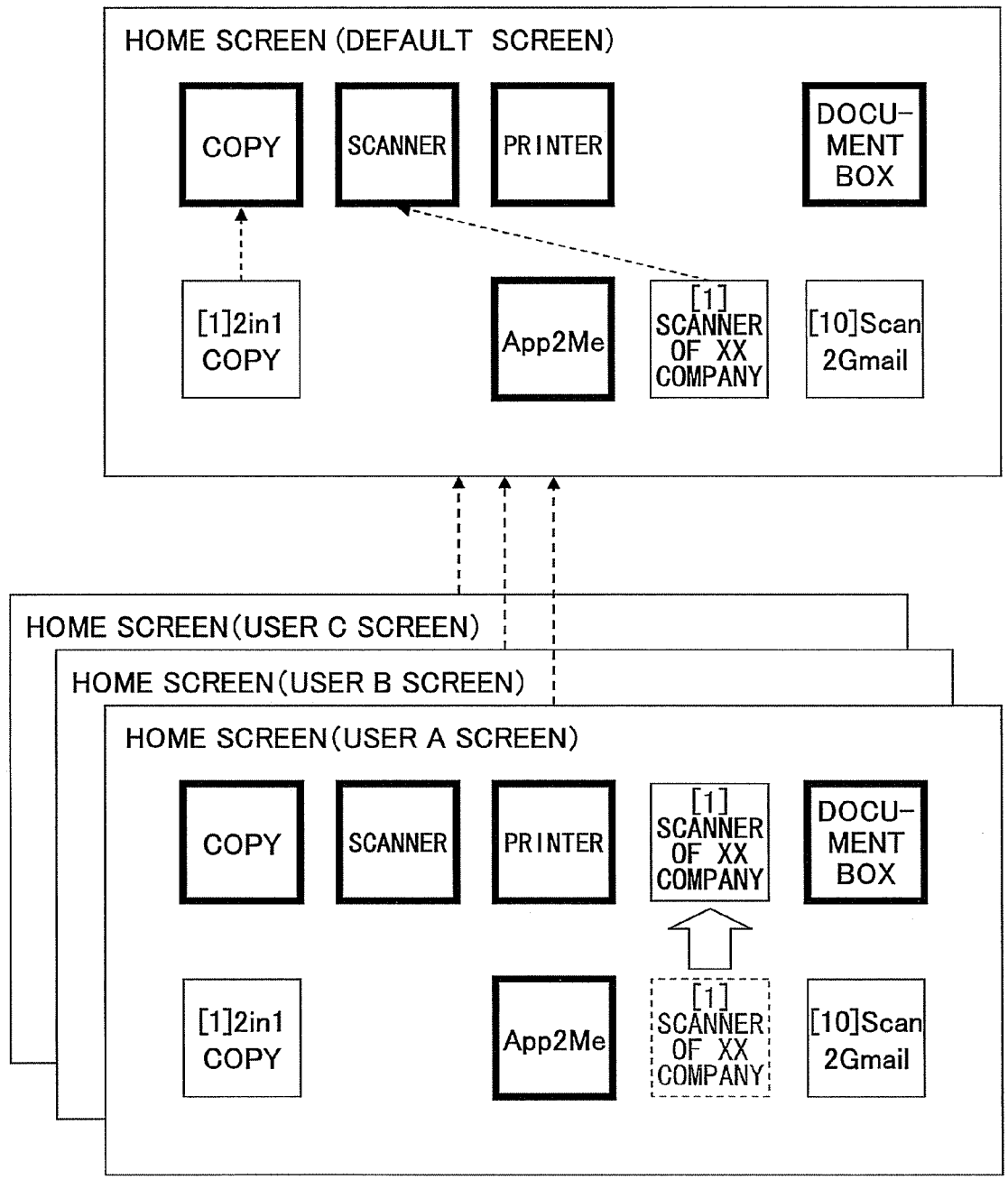
FIG. 18 is a diagram showing an example of customization (5) in an embodiment.

FIG. 18 is a diagram showing an example of customization (5) in an embodiment. FIG. 18 shows an example in which layout change is performed for a "scanner of xx company" icon (one of the various programs) displayed on the user A screen.

The input unit 71 receives customization operation for moving the "scanner of xx company" icon, and outputs received information to the screen management unit 72. The screen management unit 72 obtains a screen type of the screen of the customization target and placement item type information of the placement item.

The screen management unit 72 outputs the obtained information and details of customization to the customization control unit 75. At this time, the customization control unit 75 recognizes a customization request from the obtained information.

In the example shown in FIG. 18, the customization request includes screen type: user-by-user screen, placement item type: function dependent, and customization type: design.

The customization control unit 75 changes the layout of the "scanner of XX company" icon on the user A screen according to the customization request. There is no effect on the existing other users (B, C) and on the default screen. The reason is that the customization type is design.

Since the placement item type is "function dependent", even though use restriction is applied by hiding the "scanner of XX company" icon on the default screen, each user is not affected by that.

However, when the scanner function which is depended on by the "scanner of XX company" is use-restricted, the "scanner of XX company" cannot be used as a function on the user-by-user screen of each user so that it is use-restricted.

Figure 19:
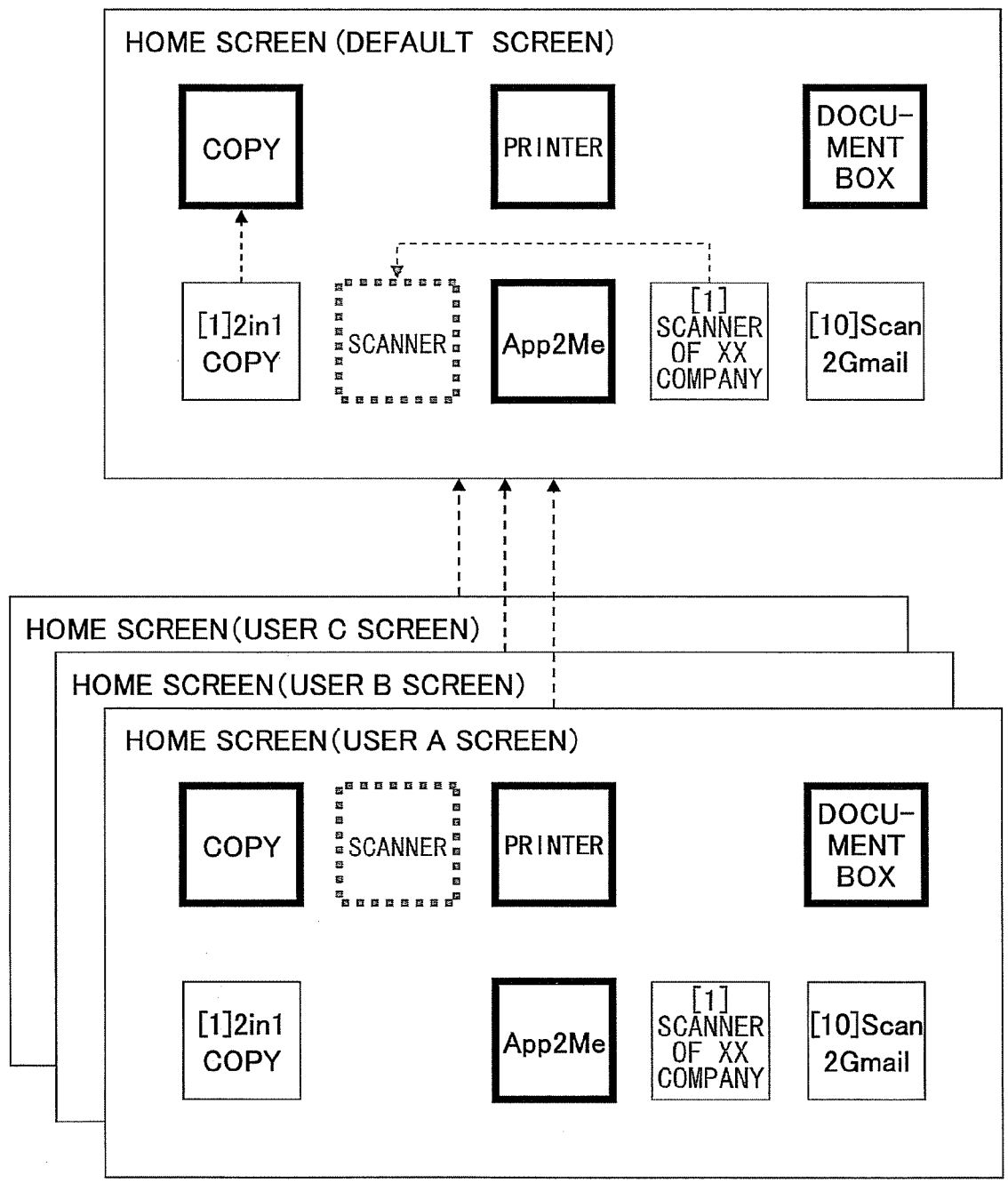
FIG. 19 is a diagram showing an example of customization (6) in an embodiment.

FIG. 19 is a diagram showing an example of customization (6) in an embodiment. FIG. 19 shows an example in which the scanner icon (one of the various programs) displayed on the default screen is hidden. In the example shown in FIG. 19, a case is described in which the shortcut icon (scanner) that is the customization target is placed in different positions between the default screen and the user-by-user screen.

The input unit 71 receives customization operation for hiding the "scanner" icon, and outputs received information to the screen management unit 72. The screen management unit 72 obtains a screen type of the screen of the customization target and placement item type information of the placement item.

The screen management unit 72 outputs the obtained information and details of customization to the customization control unit 75. At this time, the customization control unit 75 recognizes a customization request from the obtained information.

In the example shown in FIG. 19, the customization request includes screen type: default screen, placement item type: screen dependent, and customization type: use restriction.

The customization control unit 75 performs control so as to hide the "scanner" icon of every user by hiding the "scanner" icon of the default screen. That is, the customization control unit 75 performs use restriction such that every user cannot use the scanner.

Also, since the "scanner of XX company" that is a program for the scanner function in each of the default screen and the user-by-user screens depends on the scanner function, the customization control unit 75 performs use restriction on the "scanner of XX company". Thus, the "scanner of XX company" icon is hidden like the "scanner" icon.

Although contents of FIG. 19 are similar to contents described with reference to FIG. 14, there is a difference between them in that placement positions of the icon are different between the default screen and the user A screen due to layout change. However, there is no difference in processing due to the difference of placement positions of the icon, so the processing of FIG. 19 is similar to the processing of FIG. 14.

<Addition of Placement Item>

Figure 20:
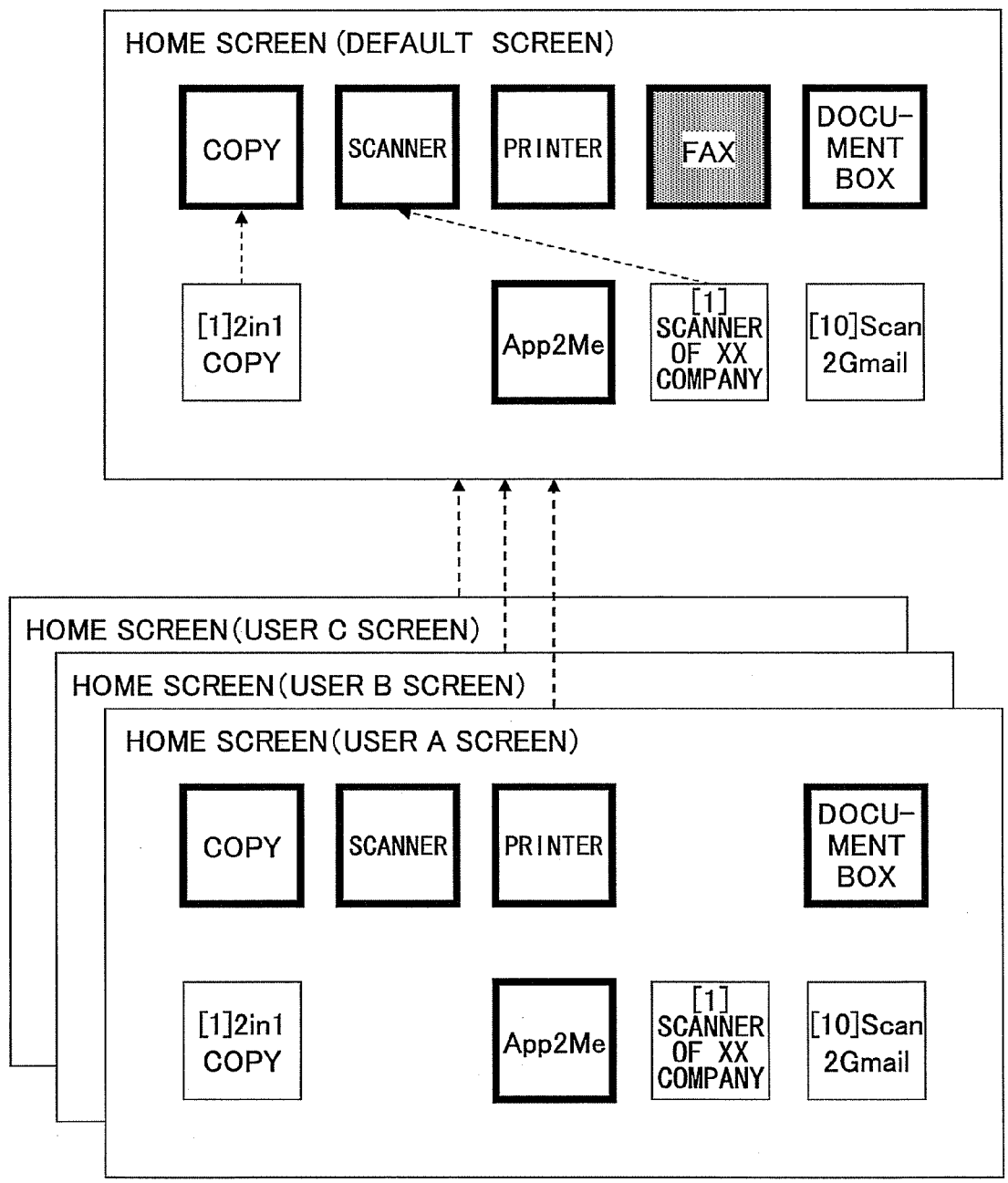
FIG. 20 is a diagram showing an example of addition of a placement item.

Next, a case where a placement item is newly added is described. FIG. 20 is a diagram showing an example of addition of a placement item. When a new application is added or a new application is registered, a placement item is newly added.

In the example shown in FIG. 20, it is considered to add a fax application function is added as a new application. When adding a function, the screen management unit 72 determines a placement item type according to whether a program of the function to be added is a program that realizes the function in itself (by itself).

If the function to be added is the program that realizes the function in itself, the screen management unit 72 sets the placement item type to be "screen dependent", if not, the screen management unit 72 sets the placement item type to be "function dependent". For example, when a "fax" icon shown in FIG. 20 is added, the placement item type becomes "screen dependent" since the "fax" is a program for realizing the fax function in itself.

Next, a case for registering a program (macro) like "4in1 copy" that is not a copy function in itself but that uses a copy function, is considered. In this case, since the "4in1 copy" is not a program for realizing the function in itself (but using other function), the screen management unit 72 registers the placement item type as "function dependent" to the placement item type information management unit 74. Accordingly, placement item type information of an added placement item can be automatically set.

<Operation>

Figure 21:
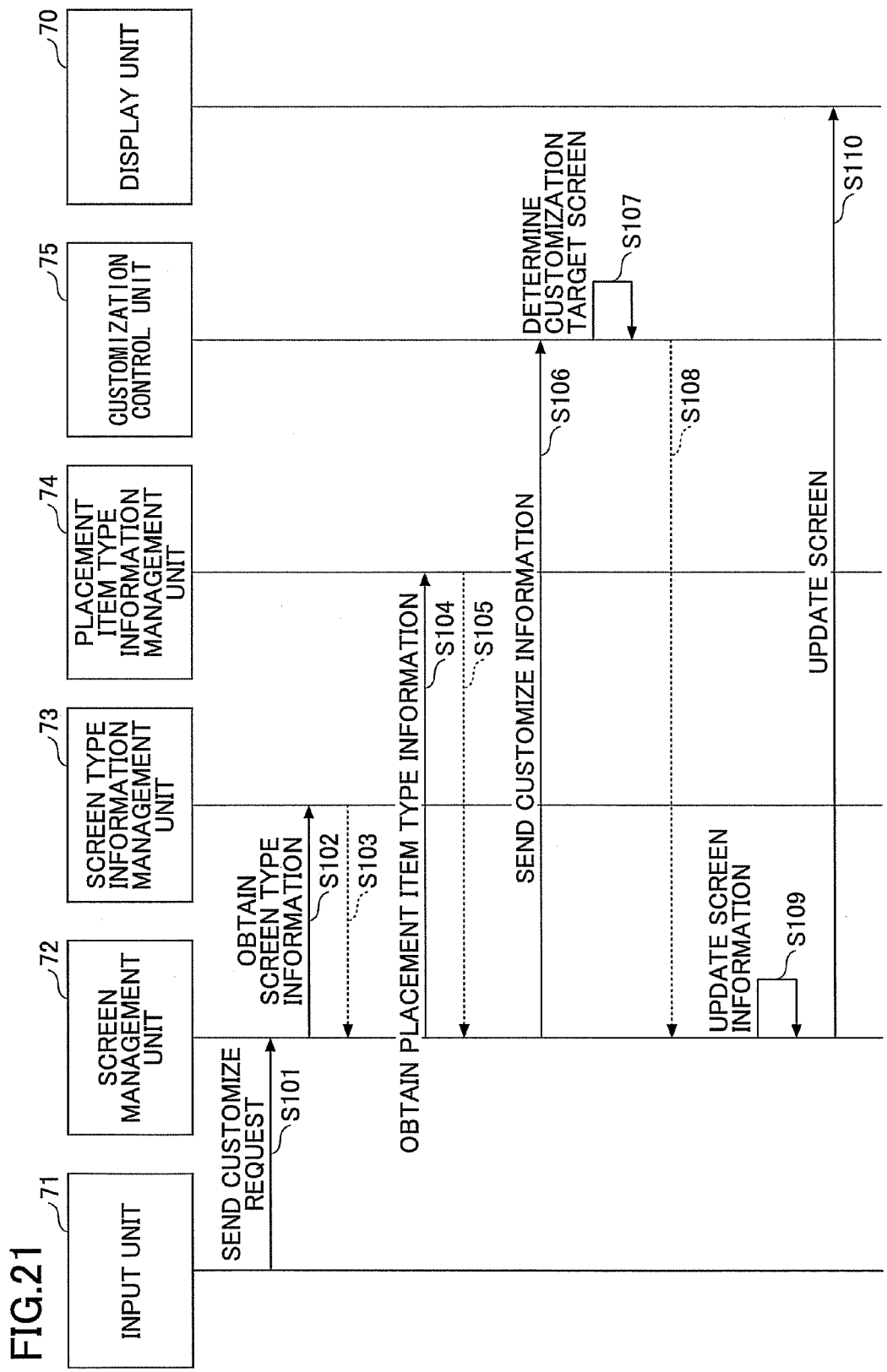
FIG. 21 is a sequence diagram showing an example of customization processing in an embodiment.

Next, operation of the MFP 1 of an embodiment is described. FIG. 21 is a sequence diagram showing an example of customization processing in the embodiment. In the operation, it is assumed that the default screen or the user-by-user screen is customized on an operation panel of the MFP 1 or by using an input measure such as a Web browser.

In step S101, the input unit 71 receives a customization request such as layout change or nondisplay of icon or the like, and reports the customization request to the screen management unit 72. The input unit 71 receives, from a user, a request for "hiding (restricting use of) copy icon", for example.

In steps S102 and S103, the screen management unit 72 obtains screen type information from the screen type information management unit 73 based on the reported customization request. The obtained screen type information is the screen type shown in FIG. 7 that is managed by the screen type information management unit 73 in the customization target screen. The screen management unit 72 obtains information of "default screen" in an example of FIG. 14, for example.

In steps S104 and S105, the screen management unit 72 obtains placement item type information from the placement item type information management unit 74 based on the reported customization request. The obtained placement item type information is the placement item type shown in FIG. 8 that is managed by the placement item type information management unit 74. The screen management unit 72 obtains information of "screen dependent" in an example of FIG. 14, for example.

In step S106, the screen management unit 72 reports these pieces of obtained information to the customization control unit 75. For example, in an example of FIG. 14, the screen management unit 72 reports information of "default screen, screen dependent, use restriction", for example.

In step S107, the customization control unit 75 determines which item of which screen the current customization is reflected in based on information obtained from the screen management unit 72. For example, in an example of FIG. 14, the customization control unit 75 determines to reflect customization in "default screen, screens of users A, B and C, copy icon, 2in1 copy". Details of customization target determination processing of step 107 are described later with reference to FIG. 22.

In step S108, after the customization control unit 75 determines a screen of a customization target and a placement item, the customization control unit 75 outputs the information to the screen management unit 72.

In step S109, the screen management unit 72 updates screen information based on information obtained from the customization control unit 75. For example, in an example of FIG. 14, the screen management unit 72 updates copy icons of the default screen and screens of users A, B and C and the "2in1 copy" icon into the nondisplay state, for example.

In step S110, the screen management unit 72 performs actual screen update processing for the display unit 70 based on the updated screen information. The display unit 70 displays an updated screen. Accordingly, customization details are reflected in each screen.

Figure 22:
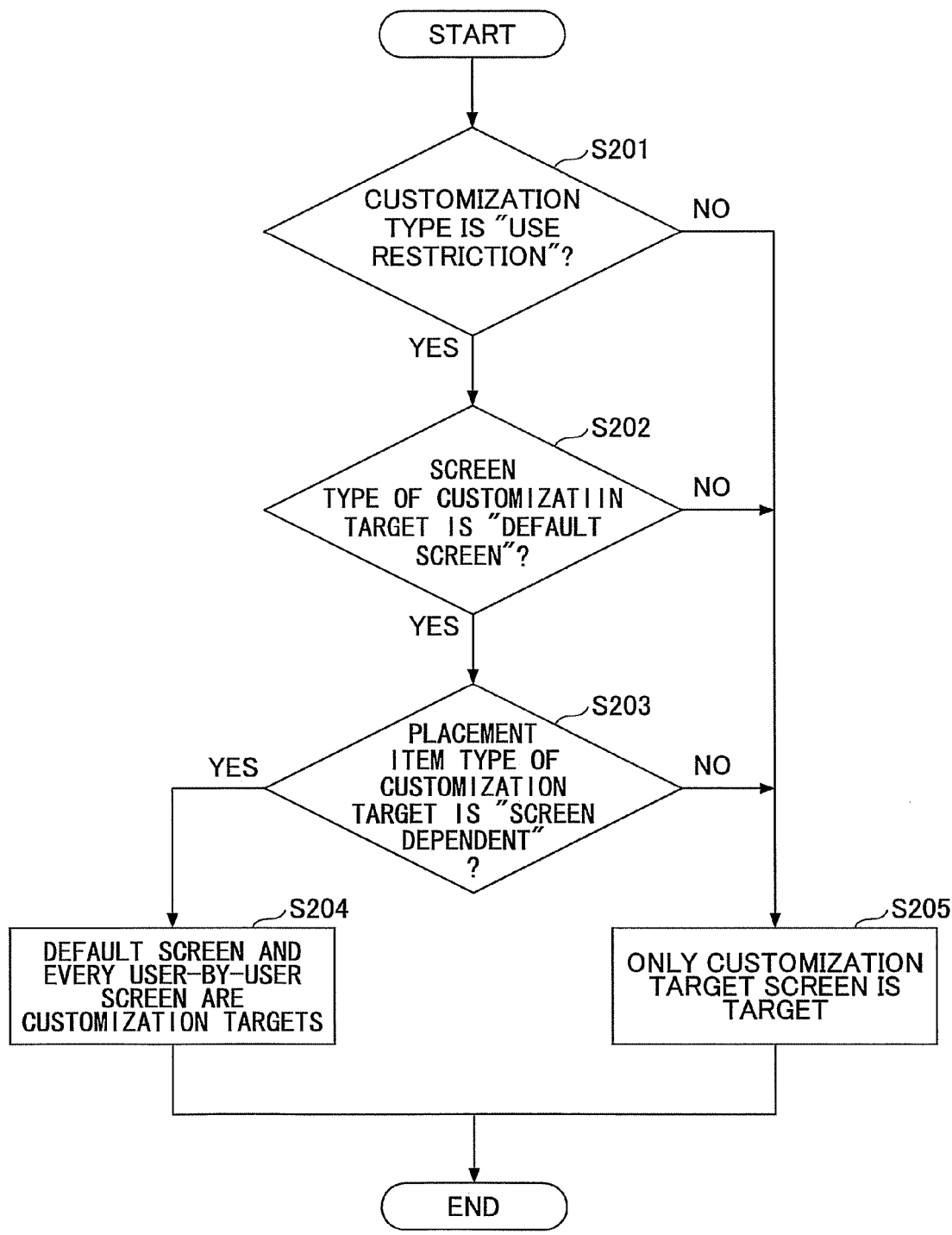
FIG. 22 is a flowchart showing an example of processing for determining a customization target in an embodiment.

FIG. 22 is a flowchart showing an example of the customization target determination processing in an embodiment. In step S201 shown in FIG. 22, the customization control unit 75 determines whether the type of customization performed by the user is "use restriction". When the customization type is "use restriction" (Yes in step S201), the process proceeds to step S202. When the customization type is not "use restriction" (No in step S201), the process proceeds to step S205.

In step S202, the customization control unit 75 determines whether the screen type of the customization target is "default screen". When the screen type is "default screen" (Yes in step S202), the process proceeds to step S203. When the screen type is not "default screen" (No in step S202), the process proceeds to step S205.

In step S203, the customization control unit 75 determines whether the placement item type of the customization target is "screen dependent". When the placement item type is "screen dependent" (Yes in step S203), the process proceeds to step S204. When the placement item type is not "screen dependent" (No in step S203), the process proceeds to step S205.

In step S204, the customization control unit 75 determines that the default screen and every user-by-user screen are customization targets. The customization control unit 75 determines whether there is an icon (function dependent icon) depending on a placement item of the customization target. When there is the icon, the customization control unit 75 determines that the icon of the "function dependent" is also a customization target.

In step S205, the customization control unit 75 determines that only the customization target screen is a target for customization. This determination processing is performed for every placement item requested to be customized on the customization target screen.

Accordingly, when predetermined conditions are satisfied for a placement item of a customization target, customization can be reflected in plural screens collectively.

Figure 23:
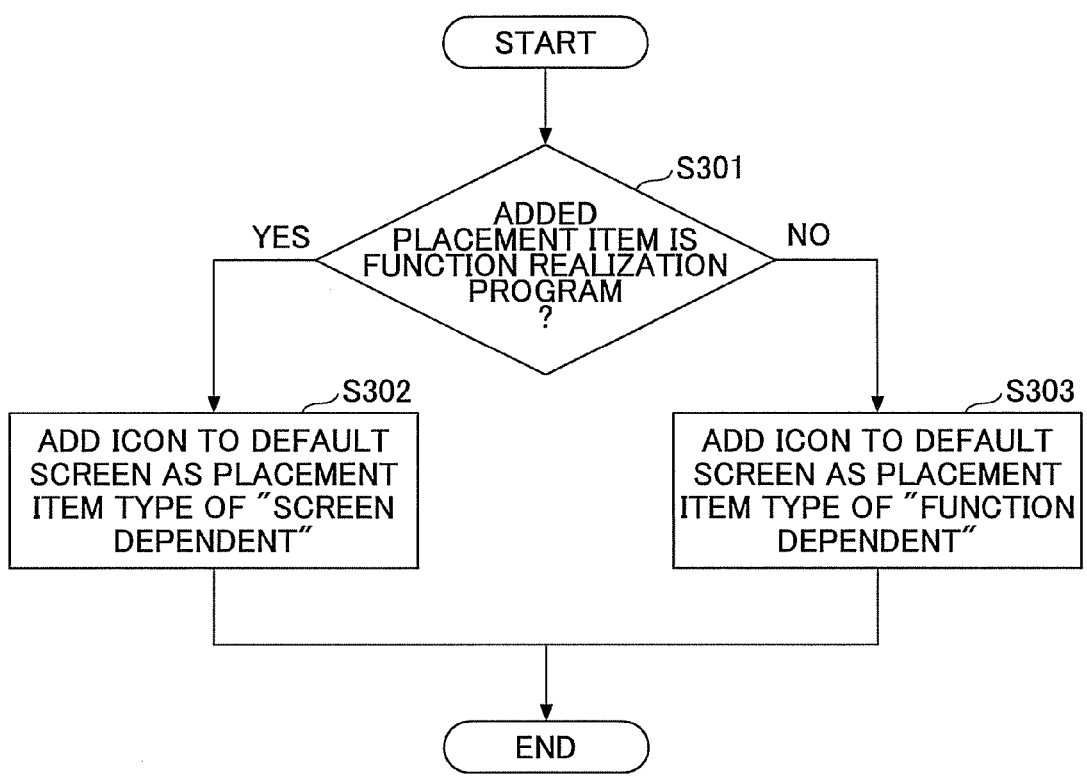
FIG. 23 is a flowchart showing an example of processing for determining a placement item type in an embodiment.

Next, processing for determining a placement item type when a placement item is newly added is described. FIG. 23 is a flowchart showing an example of processing for determining a placement item type in an embodiment. In step S301 shown in FIG. 23, the screen management unit 72 determines whether the placement item to be added to a home screen and the like is a function realization program. The function realization program is an application in itself, and does not include a program, like a macro, that calls an application and sets setting values to the application.

When the placement item to be added is the function realization program (Yes in step S301), the process goes to step S302. When the placement item to be added is not the function realization program (No in step S301), the process goes to step S303.

In step S302, the screen management unit 72 adds an icon to the default screen in which "screen dependent" is set as the placement icon type.

In step S303, the screen management unit 72 adds an icon to the default screen in which "function dependent" is set as the placement icon type.

Accordingly, for example, the placement item type of an icon (placement item) to be newly added can be automatically set in an application list screen. At this time, although the placement item is not automatically added to the user-by-user screen, it is possible to use the added-placement item by customizing the user-by-user screen. The state of this case is the same as the state in which the "copy" icon is hidden in FIG. 16. That is, the state of this case is the same as the state in which, although the added-placement item is usable, it is hidden since it is not used.

As mentioned above, according to the present embodiment, it becomes possible to improve operability of a user and to make it easy to manage and control customization settings.

[Modified Example]

A program to be executed in the image forming apparatus (MFP) of the embodiment is recorded in a computer readable non-transitory recording medium as an installable format file or as an executable format file, so that a recording medium is provided. As examples of a recording medium, there are a CD-ROM, a flexible disk (FD), a CD-R, a DVD (Digital Versatile Disk) and the like.

Also, the program to be executed in the image forming apparatus of the embodiment may be provided by storing the program in a computer connected to a network such as the Internet such that a user can download the program via the network. Also, the program to be executed in the image forming apparatus of the embodiment may be provided or delivered via a network such as the Internet.

In addition, the program to be executed in the image forming apparatus of the embodiment may be embedded in a ROM and the like, and the ROM may be provided.

The program to be executed in the image forming apparatus of the embodiment has a module configuration including modules corresponding to before-mentioned functional units. That is, the control unit 11 (processor) reads the program from the auxiliary storage unit 13 and executes the program, so that one or more modules are loaded on the main storage unit 12 and one or more units are generated on the main storage unit 12.

The present invention is not limited to the above-described embodiments, but various variations and modifications may be made without departing from the scope of the present invention. In addition, by properly combining configuration components disclosed in the above-mentioned embodiments, various examples can be formed. For example, some configuration components may be deleted from the whole configuration components disclosed in the embodiments.

What is claimed is:

1. An image forming apparatus comprising:
a first management unit configured to manage screen type information including a type that indicates a dependence relationship between plural UI screens when performing customization for a UI screen, each of the plural UI screens being assigned to each of plural users;
a second management unit configured to manage placement item type information including a type that indicates whether a placement item to be placed on the each of the plural UI screens reflects a customization of a default UI screen, wherein the each of the plural UI screens depends on the default UI screen;
a third management unit configured to perform management and display control for configurations of the plural UI screens; and
a customization control unit configured to, in a case where a predetermined placement item of the default UI screen that is display-controlled by the third management unit is set so as not to be displayed for a customization, determine whether corresponding placement item of the each of the plural UI screens that depends on the default UI screen reflects the customization of the default UI screen based on the screen type information of the default UI screen and the placement item type information of the placement item of the customization target.

2. The image forming apparatus as claimed in claim 1, wherein, when there is a dependence relationship between first and second placement items to be placed on the default UI screen, the dependence relationship is set to the placement item type information, and
when customization for applying use restriction to the first placement item is performed on the default UI screen, the customization control unit applies the customization for applying the use restriction for placement items that correspond to the first and second placement items on the each of the plural UI screen.

3. The image forming apparatus as claimed in claim 1, wherein, when a placement item is added to a UI screen, the third management unit determines a type of the placement item to be added by determining whether a program corresponding to the placement item to be added is a program for realizing a function in itself; and
the second management unit manages the determined type and the placement item to be added by associating them with each other.

4. The image forming apparatus as claimed in claim 1, wherein the screen type information includes types of a default screen and a user-by-user screen that depends on the default screen.

5. The image forming apparatus as claimed in claim 1, wherein the placement item type information includes
a screen dependent type in which customization of a UI screen which is depended on is reflected and
a function dependent type in which customization of a UI screen which is depended on is not reflected.

6. The image forming apparatus as claimed in claim 5, wherein the function dependent type includes a dependence relationship between placement items.

7. A customization control method to be performed by an image forming apparatus including:
a first management unit configured to manage screen type information including a type that indicates a dependence relationship between plural UI screens when performing customization for a UI screen, each of the plural UI screens being assigned to each of plural users;
a second management unit configured to manage placement item type information including a type that indicates whether a placement item to be placed on the each of the plural UI screens reflects a customization of a default UI screen, wherein the each of the plural UI screens depends on the default UI screen;
a third management unit configured to perform management and display control for configurations of the plural UI screens; and
a customization control unit configured to, in a case where a predetermined placement item of the default UI screen that is display-controlled by the third management unit is set so as not to be displayed for a customization, determine whether corresponding placement item of the each of the plural UI screens that depends on the default UT screen reflects the customization of the default UI screen based on the screen type information of the default UI screen and the placement item type information of the placement item of the customization target, said method comprising the steps of:

obtaining, by the first management unit, from a storage unit, screen type information including a type that indicates a dependence relationship between the plural UI screens when performing customization for a UI screen, said each of the plural UI screens being assigned to the each of the plural users;

obtaining, by the second management unit, from a storage unit, placement item type information including a type that indicates whether a placement item to be placed on the each of the plural UI screens reflects the customization of the default UI screen, wherein the each of the plural UI screens depends on the default UI screen; and performing management and display control, by the third management unit, for a predetermined UI screen;

wherein the method further comprises, in a case where the predetermined placement item of the default UI screen that is display-controlled is set so as not to be displayed for a customization, determining, by the customization control unit, whether the corresponding placement item of the each of the plural UI screens that depends on the default UI screen reflects the customization of the default UI screen based on the screen type information of the default UI screen and the placement item type information of the placement item of the customization target.

8. A non-transitory computer-readable recording medium recording a program configured to cause a computer to execute the steps of:

obtaining, from a storage unit, screen type information including a type that indicates a dependence relationship between plural UI screens when performing customization for a UI screen, each of the plural UI screens being assigned to each of plural users;

obtaining, from a storage unit, placement item type information including a type that indicates whether a placement item to be placed on screen the each of the plural UI screens reflects a customization of a default UT screen, wherein the each of the plural UI screens depends on the default UI screen; and performing management and display control for a predetermined UI screen;

wherein the steps further comprise, in a case where a predetermined placement item of the default UI screen that is display-controlled is set so as not to be displayed for a customization, determining whether corresponding placement item of the each of the plural UI screens that depends on the predetermined UI screen reflects the customization of the default UI screen based on the screen type information of the default UI screen and the placement item type information of the placement item of the customization target.

* * * * *